United States Patent
Li et al.

(10) Patent No.: US 11,246,131 B2
(45) Date of Patent: Feb. 8, 2022

(54) DATA TRANSMISSION METHOD AND DEVICE

(71) Applicant: Huawei Technologies Co., Ltd., Shenzhen (CN)

(72) Inventors: Qiang Li, Beijing (CN); Qiang Wu, Beijing (CN); Bingyu Qu, Beijing (CN); Yongxing Zhou, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 88 days.

(21) Appl. No.: 16/735,405

(22) Filed: Jan. 6, 2020

(65) Prior Publication Data

US 2020/0221458 A1 Jul. 9, 2020

Related U.S. Application Data

(63) Continuation of application No. 16/393,181, filed on Apr. 24, 2019, now Pat. No. 10,555,302, which is a
(Continued)

(51) Int. Cl.
*H04W 72/04* (2009.01)
*H04W 4/08* (2009.01)
(Continued)

(52) U.S. Cl.
CPC ....... *H04W 72/0446* (2013.01); *H04L 5/0044* (2013.01); *H04L 5/0053* (2013.01);
(Continued)

(58) Field of Classification Search
CPC ... H04L 1/1854; H04L 1/1861; H04L 1/1887; H04L 5/0053; H04L 5/0055
See application file for complete search history.

(56) References Cited

U.S. PATENT DOCUMENTS

| 2009/0264128 A1 | 10/2009 | Tomisawa |
| 2013/0316721 A1 | 11/2013 | Lan et al. |

(Continued)

FOREIGN PATENT DOCUMENTS

| CN | 1375955 A | 10/2002 |
| CN | 101562857 A | 10/2009 |

(Continued)

OTHER PUBLICATIONS

3GPP TS 36.300 V11.12.0(Dec. 2014), 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11), 210 pages.

(Continued)

*Primary Examiner* — Jamal Javaid
(74) *Attorney, Agent, or Firm* — Slater Matsil, LLP

(57) ABSTRACT

A method includes determining a type of a first subframe, where the type of the first subframe is a first-type subframe, a second-type subframe, a third-type subframe, or a fourth-type subframe, where the second-type subframe includes an uplink control channel and a downlink channel, the uplink control channel is located after the downlink channel, and there is a guard period between the uplink control channel and the downlink channel. The fourth-type subframe includes an uplink channel and a downlink control channel, the uplink channel is located after the downlink control channel, and there is a guard period between the uplink channel and the downlink control channel. The method also includes transmitting data in the first subframe according to the type of the first subframe.

26 Claims, 6 Drawing Sheets

---

Determine a type of a first subframe for data transmission, where the type of the first subframe is a first-type subframe, a second-type subframe, a third-type subframe, or a fourth-type subframe — 201

Transmit data in the first subframe according to the determined type of the first subframe — 202

Related U.S. Application Data continuation of application No. 15/659,279, filed on Jul. 25, 2017, now Pat. No. 10,517,091, which is a continuation of application No. PCT/CN2015/071550, filed on Jan. 26, 2015.

(51) Int. Cl.
  *H04L 5/00* (2006.01)
  *H04L 5/14* (2006.01)
  *H04L 25/03* (2006.01)

(52) U.S. Cl.
  CPC .......... *H04L 5/0082* (2013.01); *H04L 5/1469* (2013.01); *H04W 4/08* (2013.01); *H04W 72/042* (2013.01); *H04W 72/0413* (2013.01); *H04L 5/0064* (2013.01); *H04L 2025/03547* (2013.01)

(56) References Cited

U.S. PATENT DOCUMENTS

| | | |
|---|---|---|
| 2014/0307669 A1 | 10/2014 | Yang et al. |
| 2015/0085723 A1 | 3/2015 | Chen et al. |
| 2015/0110026 A1 | 4/2015 | Lee et al. |
| 2015/0181539 A1 | 6/2015 | Aiba et al. |
| 2015/0264669 A1 | 9/2015 | Kim et al. |
| 2015/0358847 A1 | 12/2015 | Takahashi et al. |
| 2016/0007344 A1 | 1/2016 | Yang et al. |
| 2016/0080133 A1 | 3/2016 | Golitschek Edler von Elbwart et al. |
| 2016/0150532 A1* | 5/2016 | Bhushan ............ H04W 72/042 370/336 |
| 2017/0019237 A1 | 1/2017 | Yang et al. |

FOREIGN PATENT DOCUMENTS

| | | |
|---|---|---|
| CN | 101834821 A | 9/2010 |
| CN | 101841906 A | 9/2010 |
| CN | 102656831 A | 9/2012 |
| CN | 102802127 A | 11/2012 |
| CN | 103188811 A | 7/2013 |
| CN | 103458513 A | 12/2013 |
| CN | 103840931 A | 6/2014 |
| CN | 104125644 A | 10/2014 |
| CN | 104247304 A | 12/2014 |
| JP | 2016518087 A | 6/2016 |
| WO | 2012106848 A1 | 8/2012 |
| WO | 2014046516 A1 | 3/2014 |
| WO | 2014057604 A1 | 4/2014 |
| WO | 2014073776 A1 | 5/2014 |
| WO | 2014180896 A1 | 11/2014 |
| WO | 2015005162 A1 | 1/2015 |

OTHER PUBLICATIONS

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2 (Release 12)," 3GPP TS 36.300 V12.4.0, Dec. 2014, 251 pages.

Levanen, T. et al., "Dense Small-Cell Networks: Rethinking the Radio Interface Beyond LTE-Advanced," 2014 1st International Conference on 5G for Ubiquitous Connectivity (5GU), XP032735039, Nov. 2014, 7 pages.

Mogensen, P. et al., "5G Small Cell Optimized Radio Design," Globecom 2013 Workshop—Emerging Technologies for LTE-Advanced and Beyond—4G, 2013, 6 pages.

Qualcomm Europe, "New Burst Structures—Edits to Section 11," 3GPP Draft, GP-060641, TSG-GERAN #29, 3rd Generation Partnership Project (3GPP), Mobile Competence Center, Apr. 24-28, 2006, 13 pages.

3rd Generation Partnership Project; Technical Specification Group Radio Access Network; Evolved Universal Terrestrial Radio Access (E-UTRA); Physical channels and modulation (Release 12), 3GPP TS 36.211 V12.4.0 (Dec. 2014),124 pages.

\* cited by examiner

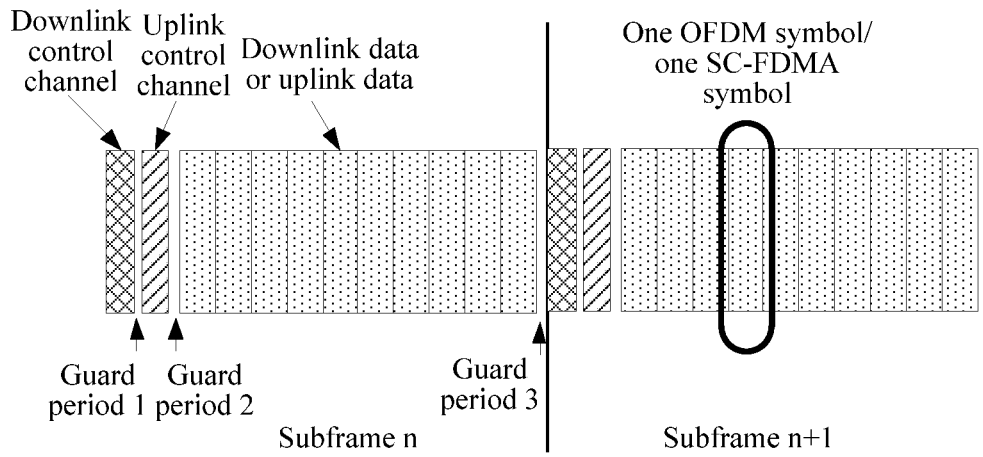

FIG. 1

```
┌─────────────────────────────────────────────────────────────┐
│ Determine a type of a first subframe for data transmission, │─── 201
│ where the type of the first subframe is a first-type        │
│ subframe, a second-type subframe, a third-type subframe,    │
│ or a fourth-type subframe                                   │
└─────────────────────────────────────────────────────────────┘
                              │
                              ▼
┌─────────────────────────────────────────────────────────────┐
│ Transmit data in the first subframe according to the        │─── 202
│ determined type of the first subframe                       │
└─────────────────────────────────────────────────────────────┘
```

FIG. 2

```
┌─────────────────────────────────────────────────────────────┐
│ Determine a type of a first subframe for data transmission, │─── 301
│ where the type of the first subframe is a first-type        │
│ subframe, a second-type subframe, a third-type subframe,    │
│ or a fourth-type subframe                                   │
└─────────────────────────────────────────────────────────────┘
                              │
                              ▼
┌─────────────────────────────────────────────────────────────┐
│ Transmit data in the first subframe according to the        │─── 302
│ determined type of the first subframe                       │
└─────────────────────────────────────────────────────────────┘
                              │
                              ▼
┌─────────────────────────────────────────────────────────────┐
│ Transmit data in a second subframe after the first          │─── 303
│ subframe, where the second subframe is adjacent to the      │
│ first subframe                                              │
└─────────────────────────────────────────────────────────────┘
```

FIG. 3

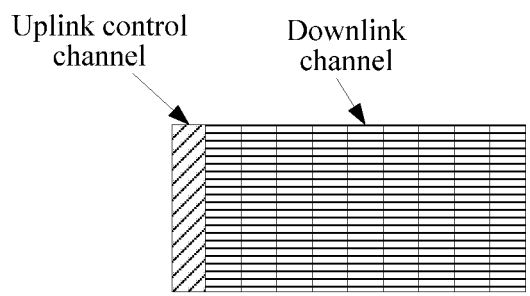
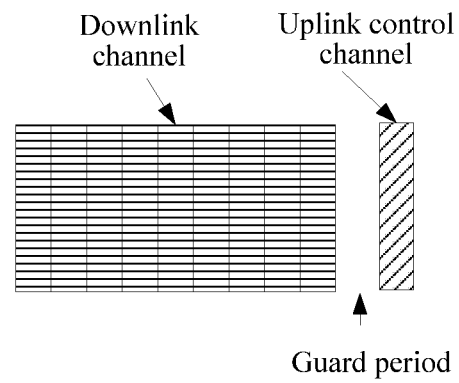
FIG. 4 (a)  FIG. 4 (b)
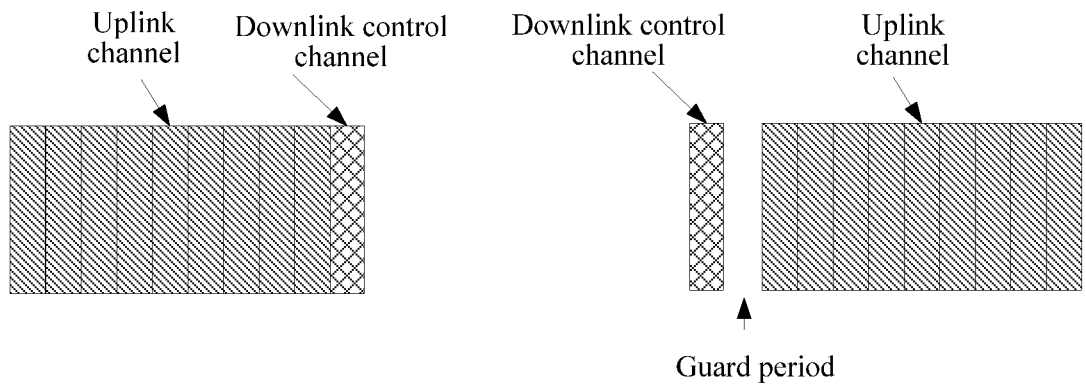
FIG. 5 (b)  FIG. 5 (a)

DATA TRANSMISSION METHOD AND DEVICE

CROSS-REFERENCE TO RELATED APPLICATIONS

This application is a continuation of U.S. application Ser. No. 16/393,181, filed on Apr. 24, 2019, which is a continuation of U.S. application Ser. No. 15/659,279, filed on Jul. 25, 2017, which issued as U.S. patent Ser. No. 10/517,091, which is a continuation of International Application No. PCT/CN2015/071550, filed on Jan. 26, 2015. All of the afore-mentioned patent applications are hereby incorporated by reference in their entireties.

TECHNICAL FIELD

The present disclosure relates to the field of wireless communications, and in particular, to a data transmission method and device.

BACKGROUND

In a wireless communications system, data transmission includes uplink transmission and downlink transmission. Uplink transmission refers to that user equipment (UE) sends data to a base station, and downlink transmission refers to that the base station sends data to the UE. In addition, different time and frequency resources need to be occupied in uplink transmission and downlink transmission. For example, in a Long Term Evolution (LTE) system that uses a time division duplex (TDD) manner, in uplink transmission and downlink transmission, frames within different time intervals need to be occupied for data transmission.

In an LTE system, a frame may be divided into ten frames, and the ten frames include an uplink subframe, a downlink subframe, and a special subframe. Each subframe may be further divided into multiple symbols in time, where the multiple symbols may be orthogonal frequency division multiplex (OFDM) symbols or single carrier frequency division multiple access (SC-FDMA) symbols. The OFDM symbol is used for downlink transmission, and the SC-FDMA symbol is used for uplink transmission.

In the prior art, as shown in FIG. 1, two consecutive subframes are included, that is, a subframe n and a subframe n+1. A first symbol of each subframe is allocated as an OFDM symbol, and the first symbol is used to transmit a downlink control channel. A second symbol is allocated as an SC-FDMA symbol, and the second symbol is used to transmit an uplink control channel. A remaining symbol following the second symbol may be allocated as an SC-FDMA symbol, or may be allocated as an OFDM symbol. Therefore, the remaining symbol following the second symbol is used to transmit uplink data or downlink data. In addition, a particular guard period is needed when a network device switches between uplink transmission and downlink transmission. The network device cannot transmit data within the guard period. Therefore, for two consecutive symbols, if one symbol is used for uplink transmission and the other symbol is used for downlink transmission, that is, one symbol is an SC-FDMA symbol and the other symbol is an OFDM symbol, a guard period needs to be set between the two symbols. As shown in FIG. 1, two times of switching between uplink transmission and downlink transmission need to be performed within each subframe, and three guard periods need to be set.

Although such existing design is relatively flexible, the design has shortcomings of resource wasting and complex implementation. Specifically, in the prior art, three guard periods need to be set in one subframe. As a result, not only effective data information cannot be sent within a time of a guard period, but also a communications device needs to frequently switch between receiving and sending states, causing an increase in implementation complexity.

SUMMARY

To reduce resources, improve utilization of radio resources, and reduce implementation complexity, embodiments of the present invention provide a data transmission method and device. The technical solutions are as follows.

According to a first aspect, a data transmission method is provided. The method includes: determining a type of a first subframe for data transmission, where the type of the first subframe is a first-type subframe, a second-type subframe, a third-type subframe, or a fourth-type subframe. The first-type subframe includes an uplink control channel and a downlink channel, and the uplink control channel of the first-type subframe is located before the downlink channel of the first-type subframe. The second-type subframe includes an uplink control channel and a downlink channel, the uplink control channel of the second-type subframe is located after the downlink channel of the second-type subframe, and there is a guard period between the uplink control channel of the second-type subframe and the downlink channel of the second-type subframe. The third-type subframe includes an uplink channel and a downlink control channel, and the uplink channel of the third-type subframe is located before the downlink control channel of the third-type subframe. The fourth-type subframe includes an uplink channel and a downlink control channel, the uplink channel of the fourth-type subframe is located after the downlink control channel of the fourth-type subframe, and there is a guard period between the uplink channel of the fourth-type subframe and the downlink control channel of the fourth-type subframe. The method also includes transmitting data in the first subframe according to the determined type of the first subframe.

With reference to the first aspect, in a first possible implementation manner of the first aspect, the method further includes: transmitting data in a second subframe after the first subframe, where the second subframe is adjacent to the first subframe, where if a data transmission direction at a start moment of the second subframe is different from a data transmission direction at an end moment of the first subframe, a guard period is further included between the first subframe and the second subframe; and if the data transmission direction at the start moment of the second subframe is the same as the data transmission direction at the end moment of the first subframe, a time period is not included between the first subframe and the second subframe.

With reference to the first aspect, in a second possible implementation manner of the first aspect, the method further includes: transmitting data in a second subframe after the first subframe, where the second subframe is adjacent to the first subframe, where if a data transmission direction at a start moment of the second subframe is an uplink and a data transmission direction at an end moment of the first subframe is a downlink, a guard period is further included between the first subframe and the second subframe.

With reference to the first aspect, or the first possible implementation manner of the first aspect, or the second possible implementation manner of the first aspect, in a third possible implementation manner of the first aspect, the determining a type of a first subframe for data transmission includes: determining, according to a first preset period, that the type of the first subframe is the first-type subframe or the second-type subframe; or determining, according to a second preset period, that the type of the first subframe is the third-type subframe or the fourth-type subframe.

With reference to the third possible implementation manner of the first aspect, in a fourth possible implementation manner of the first aspect, when it is determined, according to the first preset period, that the type of the first subframe is the first-type subframe or the second-type subframe, the first subframe is used to transmit one or a combination of a synchronization signal, a broadcast signal, or a discovery reference signal, where the broadcast signal is used to carry information about the first preset period and/or the second preset period.

With reference to the third possible implementation manner of the first aspect or the fourth possible implementation manner of the first aspect, in a fifth possible implementation manner of the first aspect, when the first preset period and the second preset period are the same, the broadcast signal indicates the first preset period or the second preset period, the broadcast signal further indicates an offset between the first preset period and the second preset period, and the offset is used to indicate a subframe number difference between subframes corresponding to the first preset period and the second preset period.

With reference to any one of the first aspect to the fifth possible implementation manner of the first aspect, in a sixth possible implementation manner of the first aspect, an uplink control channel or a downlink control channel of the first subframe carries indication information, the indication information is used to indicate a subframe type of a $k^{th}$ subframe after the first subframe, and k is a positive integer.

With reference to any one of the first aspect to the sixth possible implementation manner of the first aspect, in a seventh possible implementation manner of the first aspect, a first preset quantity of consecutive symbols in the downlink channel of the first-type subframe or a first preset quantity of consecutive symbols in the downlink channel of the second-type subframe are used to transmit a downlink control channel, and a symbol in the downlink channel of the first-type subframe other than the first preset quantity of symbols or a symbol in the downlink channel of the second-type subframe other than the first preset quantity of symbols is used to transmit downlink data, where the first preset quantity of consecutive symbols are a first preset quantity of symbols arranged first in a time order, or the first preset quantity of consecutive symbols are a first preset quantity of symbols arranged last in a time order.

With reference to any one of the first aspect to the sixth possible implementation manner of the first aspect, in an eighth possible implementation manner of the first aspect, a first frequency band set in the downlink channel of the first-type subframe or a first frequency band set in the downlink channel of the second-type subframe is used to transmit downlink data, and a second frequency band set in the downlink channel of the first-type subframe or a second frequency band set in the downlink channel of the second-type subframe is used to transmit a downlink control channel.

With reference to any one of the first aspect to the sixth possible implementation manner of the first aspect, in a ninth possible implementation manner of the first aspect, a first preset quantity of consecutive symbols in the downlink channel of the first-type subframe or a first preset quantity of consecutive symbols in the downlink channel of the second-type subframe are used to transmit a downlink control channel, a third frequency band set in a symbol in the downlink channel of the first-type subframe other than the first preset quantity of symbols or a third frequency band set in a symbol in the downlink channel of the second-type subframe other than the first preset quantity of symbols is used to transmit downlink data, and a fourth frequency band set in the symbol in the downlink channel of the first-type subframe or the downlink channel of the second-type subframe other than the first preset quantity of symbols or a fourth frequency band set in the symbol in the downlink channel of the second-type subframe other than the first preset quantity of symbols is used to transmit a downlink control channel.

With reference to any one of the first aspect to the ninth possible implementation manner of the first aspect, in a tenth possible implementation manner of the first aspect, a second preset quantity of consecutive symbols in the uplink channel of the third-type subframe or a second preset quantity of consecutive symbols in the uplink channel of the fourth-type subframe are used to transmit an uplink control channel, and a symbol in the uplink channel of the third-type subframe other than the second preset quantity of symbols or a symbol in the uplink channel of the fourth-type subframe other than the second preset quantity of symbols is used to transmit uplink data, where the second preset quantity of consecutive symbols are a second preset quantity of symbols arranged first in a time order, or the second preset quantity of consecutive symbols are a second preset quantity of symbols arranged last in a time order.

With reference to any one of the first aspect to the ninth possible implementation manner of the first aspect, in an eleventh possible implementation manner of the first aspect, a first frequency band set in the uplink channel of the third-type subframe or a first frequency band set in the uplink channel of the fourth-type subframe is used to transmit uplink data, and a second frequency band set in the uplink channel of the third-type subframe or a second frequency band set in the uplink channel of the fourth-type subframe is used to transmit an uplink control channel.

With reference to any one of the first aspect to the ninth possible implementation manner of the first aspect, in a twelfth possible implementation manner of the first aspect, a second preset quantity of consecutive symbols in the uplink channel of the third-type subframe or a second preset quantity of consecutive symbols in the uplink channel of the fourth-type subframe are used to transmit an uplink control channel, a third frequency band set in a symbol in the uplink channel of the third-type subframe other than the second preset quantity of symbols or a third frequency band set in a symbol in the uplink channel of the fourth-type subframe other than the second preset quantity of symbols is used to transmit uplink data, and a fourth frequency band set in the symbol in the uplink channel of the third-type subframe other than the second preset quantity of symbols or a fourth frequency band set in the symbol in the uplink channel of the fourth-type subframe other than the second preset quantity of symbols is used to transmit an uplink control channel.

According to a second aspect, a data transmission device is provided. The device includes a determining module, configured to determine a type of a first subframe for data transmission, where the type of the first subframe is a first-type subframe, a second-type subframe, a third-type subframe, or a fourth-type subframe. The first-type subframe includes an uplink control channel and a downlink channel, and the uplink control channel of the first-type subframe is located before the downlink channel of the first-type subframe. The second-type subframe includes an uplink control channel and a downlink channel, the uplink control channel of the second-type subframe is located after the downlink channel of the second-type subframe, and there is a guard period between the uplink control channel of the second-type subframe and the downlink channel of the second-type subframe. The third-type subframe includes an uplink channel and a downlink control channel, and the uplink channel of the third-type subframe is located before the downlink control channel of the third-type subframe. The fourth-type subframe includes an uplink channel and a downlink control channel, the uplink channel of the fourth-type subframe is located after the downlink control channel of the fourth-type subframe, and there is a guard period between the uplink channel of the fourth-type subframe and the downlink control channel of the fourth-type subframe. The device also includes a first transmission module, configured to transmit data in the first subframe according to the determined type of the first subframe.

With reference to the second aspect, in a first possible implementation manner of the second aspect, the device further includes: a second transmission module, configured to transmit data in a second subframe after the first subframe, where the second subframe is adjacent to the first subframe, where if a data transmission direction at a start moment of the second subframe is different from a data transmission direction at an end moment of the first subframe, a guard period is further included between the first subframe and the second subframe; and if the data transmission direction at the start moment of the second subframe is the same as the data transmission direction at the end moment of the first subframe, a time period is not included between the first subframe and the second subframe.

With reference to the second aspect, in a second possible implementation manner of the second aspect, the device further includes: a second transmission module, configured to transmit data in a second subframe after the first subframe, where the second subframe is adjacent to the first subframe, where if a data transmission direction at a start moment of the second subframe is an uplink and a data transmission direction at an end moment of the first subframe is a downlink, a guard period is further included between the first subframe and the second subframe.

With reference to the second aspect, or the first possible implementation manner of the second aspect, or the second possible implementation manner of the second aspect, in a third possible implementation manner of the second aspect, the determining module includes: a first determining module, configured to determine, according to a first preset period, that the type of the first subframe is the first-type subframe or the second-type subframe; or a second determining module, configured to determine, according to a second preset period, that the type of the first subframe is the third-type subframe or the fourth-type subframe.

With reference to the third possible implementation manner of the second aspect, in a fourth possible implementation manner of the second aspect, when it is determined, according to the first preset period, that the type of the first subframe is the first-type subframe or the second-type subframe, the first subframe is used to transmit one or a combination of a synchronization signal, a broadcast signal, or a discovery reference signal, where the broadcast signal is used to carry information about the first preset period and/or the second preset period.

With reference to the third possible implementation manner of the second aspect or the fourth possible implementation manner of the second aspect, in a fifth possible implementation manner of the second aspect, when the first preset period and the second preset period are the same, the broadcast signal indicates the first preset period or the second preset period, the broadcast signal further indicates an offset between the first preset period and the second preset period, and the offset is used to indicate a subframe number difference between subframes corresponding to the first preset period and the second preset period.

With reference to any one of the second aspect to the fifth possible implementation manner of the second aspect, in a sixth possible implementation manner of the second aspect, an uplink control channel or a downlink control channel of the first subframe carries indication information, the indication information is used to indicate a subframe type of a $k^{th}$ subframe after the first subframe, and k is a positive integer.

With reference to any one of the second aspect to the sixth possible implementation manner of the second aspect, in a seventh possible implementation manner of the second aspect, a first preset quantity of consecutive symbols in the downlink channel of the first-type subframe or a first preset quantity of consecutive symbols in the downlink channel of the second-type subframe are used to transmit a downlink control channel, and a symbol in the downlink channel of the first-type subframe other than the first preset quantity of symbols or a symbol in the downlink channel of the second-type subframe other than the first preset quantity of symbols is used to transmit downlink data, where the first preset quantity of consecutive symbols are a first preset quantity of symbols arranged first in a time order, or the first preset quantity of consecutive symbols are a first preset quantity of symbols arranged last in a time order.

With reference to any one of the second aspect to the sixth possible implementation manner of the second aspect, in an eighth possible implementation manner of the second aspect, a first frequency band set in the downlink channel of the first-type subframe or a first frequency band set in the downlink channel of the second-type subframe is used to transmit downlink data, and a second frequency band set in the downlink channel of the first-type subframe or a second frequency band set in the downlink channel of the second-type subframe is used to transmit a downlink control channel.

With reference to any one of the second aspect to the sixth possible implementation manner of the second aspect, in a ninth possible implementation manner of the second aspect, a first preset quantity of consecutive symbols in the downlink channel of the first-type subframe or a first preset quantity of consecutive symbols in the downlink channel of the second-type subframe are used to transmit a downlink control channel, a third frequency band set in a symbol in the downlink channel of the first-type subframe other than the first preset quantity of symbols or a third frequency band set in a symbol in the downlink channel of the second-type subframe other than the first preset quantity of symbols is used to transmit downlink data, and a fourth frequency band set in the symbol in the downlink channel of the first-type subframe or the downlink channel of the second-type subframe other than the first preset quantity of symbols or a fourth frequency band set in the symbol in the downlink channel of the second-type subframe other than the first preset quantity of symbols is used to transmit a downlink control channel.

With reference to any one of the second aspect to the ninth possible implementation manner of the second aspect, in a tenth possible implementation manner of the second aspect, a second preset quantity of consecutive symbols in the uplink channel of the third-type subframe or a second preset quantity of consecutive symbols in the uplink channel of the fourth-type subframe are used to transmit an uplink control channel, and a symbol in the uplink channel of the third-type subframe other than the second preset quantity of symbols or a symbol in the uplink channel of the fourth-type subframe other than the second preset quantity of symbols is used to transmit uplink data, where the second preset quantity of consecutive symbols are a second preset quantity of symbols arranged first in a time order, or the second preset quantity of consecutive symbols are a second preset quantity of symbols arranged last in a time order.

With reference to any one of the second aspect to the ninth possible implementation manner of the second aspect, in an eleventh possible implementation manner of the second aspect, a first frequency band set in the uplink channel of the third-type subframe or a first frequency band set in the uplink channel of the fourth-type subframe is used to transmit uplink data, and a second frequency band set in the uplink channel of the third-type subframe or a second frequency band set in the uplink channel of the fourth-type subframe is used to transmit an uplink control channel.

With reference to any one of the second aspect to the ninth possible implementation manner of the second aspect, in a twelfth possible implementation manner of the second aspect, a second preset quantity of consecutive symbols in the uplink channel of the third-type subframe or a second preset quantity of consecutive symbols in the uplink channel of the fourth-type subframe are used to transmit an uplink control channel, a third frequency band set in a symbol in the uplink channel of the third-type subframe other than the second preset quantity of symbols or a third frequency band set in a symbol in the uplink channel of the fourth-type subframe other than the second preset quantity of symbols is used to transmit uplink data, and a fourth frequency band set in the symbol in the uplink channel of the third-type subframe other than the second preset quantity of symbols or a fourth frequency band set in the symbol in the uplink channel of the fourth-type subframe other than the second preset quantity of symbols is used to transmit an uplink control channel.

According to a third aspect, a data transmission device is provided. The device includes a processor, configured to determine a type of a first subframe for data transmission, where the type of the first subframe is a first-type subframe, a second-type subframe, a third-type subframe, or a fourth-type subframe. The first-type subframe includes an uplink control channel and a downlink channel, and the uplink control channel of the first-type subframe is located before the downlink channel of the first-type subframe. The second-type subframe includes an uplink control channel and a downlink channel, the uplink control channel of the second-type subframe is located after the downlink channel of the second-type subframe, and there is a guard period between the uplink control channel of the second-type subframe and the downlink channel of the second-type subframe. The third-type subframe includes an uplink channel and a downlink control channel, and the uplink channel of the third-type subframe is located before the downlink control channel of the third-type subframe. The fourth-type subframe includes an uplink channel and a downlink control channel, the uplink channel of the fourth-type subframe is located after the downlink control channel of the fourth-type subframe, and there is a guard period between the uplink channel of the fourth-type subframe and the downlink control channel of the fourth-type subframe. The device also includes a transmitter, configured to transmit data in the first subframe according to the determined type of the first subframe.

With reference to the third aspect, in a first possible implementation manner of the third aspect, the device further includes: the transmitter, further configured to transmit data in a second subframe after the first subframe, where the second subframe is adjacent to the first subframe, where if a data transmission direction at a start moment of the second subframe is different from a data transmission direction at an end moment of the first subframe, a guard period is further included between the first subframe and the second subframe; and if the data transmission direction at the start moment of the second subframe is the same as the data transmission direction at the end moment of the first subframe, a time period is not included between the first subframe and the second subframe.

With reference to the third aspect, in a second possible implementation manner of the third aspect, the device further includes: the transmitter, further configured to transmit data in a second subframe after the first subframe, where the second subframe is adjacent to the first subframe, where if a data transmission direction at a start moment of the second subframe is an uplink and a data transmission direction at an end moment of the first subframe is a downlink, a guard period is further included between the first subframe and the second subframe.

With reference to the third aspect, or the first possible implementation manner of the third aspect, or the second possible implementation manner of the third aspect, in a third possible implementation manner of the third aspect, where the processor is further configured to determine, according to a first preset period, that the type of the first subframe is the first-type subframe or the second-type subframe; or the processor is further configured to determine, according to a second preset period, that the type of the first subframe is the third-type subframe or the fourth-type subframe.

With reference to the third possible implementation manner of the third aspect, in a fourth possible implementation manner of the third aspect, when it is determined, according to the first preset period, that the type of the first subframe is the first-type subframe or the second-type subframe, the first subframe is used to transmit one or a combination of a synchronization signal, a broadcast signal, or a discovery reference signal, where the broadcast signal is used to carry information about the first preset period and/or the second preset period.

With reference to the third possible implementation manner of the third aspect or the fourth possible implementation manner of the third aspect, in a fifth possible implementation manner of the third aspect, when the first preset period and the second preset period are the same, the broadcast signal indicates the first preset period or the second preset period, the broadcast signal further indicates an offset between the first preset period and the second preset period, and the offset is used to indicate a subframe number difference between subframes corresponding to the first preset period and the second preset period.

With reference to any one of the third aspect to the fifth possible implementation manner of the third aspect, in a sixth possible implementation manner of the third aspect, an uplink control channel or a downlink control channel of the first subframe carries indication information, the indication information is used to indicate a subframe type of a $k^{th}$ subframe after the first subframe, and k is a positive integer.

With reference to any one of the third aspect to the sixth possible implementation manner of the third aspect, in a seventh possible implementation manner of the third aspect, a first preset quantity of consecutive symbols in the downlink channel of the first-type subframe or a first preset quantity of consecutive symbols in the downlink channel of the second-type subframe are used to transmit a downlink control channel, and a symbol in the downlink channel of the first-type subframe other than the first preset quantity of symbols or a symbol in the downlink channel of the second-type subframe other than the first preset quantity of symbols is used to transmit downlink data, where the first preset quantity of consecutive symbols are a first preset quantity of symbols arranged first in a time order, or the first preset quantity of consecutive symbols are a first preset quantity of symbols arranged last in a time order.

With reference to any one of the third aspect to the sixth possible implementation manner of the third aspect, in an eighth possible implementation manner of the third aspect, a first frequency band set in the downlink channel of the first-type subframe or a first frequency band set in the downlink channel of the second-type subframe is used to transmit downlink data, and a second frequency band set in the downlink channel of the first-type subframe or a second frequency band set in the downlink channel of the second-type subframe is used to transmit a downlink control channel.

With reference to any one of the third aspect to the sixth possible implementation manner of the third aspect, in a ninth possible implementation manner of the third aspect, a first preset quantity of consecutive symbols in the downlink channel of the first-type subframe or a first preset quantity of consecutive symbols in the downlink channel of the second-type subframe are used to transmit a downlink control channel, a third frequency band set in a symbol in the downlink channel of the first-type subframe other than the first preset quantity of symbols or a third frequency band set in a symbol in the downlink channel of the second-type subframe other than the first preset quantity of symbols is used to transmit downlink data, and a fourth frequency band set in the symbol in the downlink channel of the first-type subframe or the downlink channel of the second-type subframe other than the first preset quantity of symbols or a fourth frequency band set in the symbol in the downlink channel of the second-type subframe other than the first preset quantity of symbols is used to transmit a downlink control channel.

With reference to any one of the third aspect to the ninth possible implementation manner of the third aspect, in a tenth possible implementation manner of the third aspect, a second preset quantity of consecutive symbols in the uplink channel of the third-type subframe or a second preset quantity of consecutive symbols in the uplink channel of the fourth-type subframe are used to transmit an uplink control channel, and a symbol in the uplink channel of the third-type subframe other than the second preset quantity of symbols or a symbol in the uplink channel of the fourth-type subframe other than the second preset quantity of symbols is used to transmit uplink data, where the second preset quantity of consecutive symbols are a second preset quantity of symbols arranged first in a time order, or the second preset quantity of consecutive symbols are a second preset quantity of symbols arranged last in a time order.

With reference to any one of the third aspect to the ninth possible implementation manner of the third aspect, in an eleventh possible implementation manner of the third aspect, a first frequency band set in the uplink channel of the third-type subframe or a first frequency band set in the uplink channel of the fourth-type subframe is used to transmit uplink data, and a second frequency band set in the uplink channel of the third-type subframe or a second frequency band set in the uplink channel of the fourth-type subframe is used to transmit an uplink control channel.

With reference to any one of the third aspect to the ninth possible implementation manner of the third aspect, in a twelfth possible implementation manner of the third aspect, a second preset quantity of consecutive symbols in the uplink channel of the third-type subframe or a second preset quantity of consecutive symbols in the uplink channel of the fourth-type subframe are used to transmit an uplink control channel, a third frequency band set in a symbol in the uplink channel of the third-type subframe other than the second preset quantity of symbols or a third frequency band set in a symbol in the uplink channel of the fourth-type subframe other than the second preset quantity of symbols is used to transmit uplink data, and a fourth frequency band set in the symbol in the uplink channel of the third-type subframe other than the second preset quantity of symbols or a fourth frequency band set in the symbol in the uplink channel of the fourth-type subframe other than the second preset quantity of symbols is used to transmit an uplink control channel.

The technical solutions provided in the embodiments of the present invention have the following beneficial effects.

In the embodiments of the present invention, a type of a first subframe for data transmission is determined, where the type of the first subframe is a first-type subframe, a second-type subframe, a third-type subframe, or a fourth-type subframe. An uplink control channel of the first-type subframe is located before a downlink channel of the first-type subframe, and a guard period is not included between the uplink control channel of the first-type subframe and the downlink channel of the first-type subframe, thereby reducing a quantity of times of switching, and further reducing a quantity of guard periods. An uplink control channel of the second-type subframe is located after a downlink channel of the second-type subframe, there is a guard period between the uplink control channel of the second-type subframe and the downlink channel of the second-type subframe, and only one time of switching between uplink transmission and downlink transmission is performed, thereby reducing the quantity of times of switching, and further reducing the quantity of guard periods. An uplink channel of the third-type subframe is located before a downlink control channel of the third-type subframe, and a guard period is not included between the uplink channel of the third-type subframe and the downlink control channel of the third-type subframe, thereby reducing the quantity of times of switching, and further reducing the quantity of guard periods. An uplink channel of the fourth-type subframe is located after a downlink control channel of the fourth-type subframe, there is a guard period between the uplink channel of the fourth-type subframe and the downlink control channel of the fourth-type subframe, and only one time of switching between uplink transmission and downlink transmission is performed, thereby reducing the quantity of times of switching, and further reducing the quantity of guard periods. In this way, utilization of wireless resources is improved.

BRIEF DESCRIPTION OF THE DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

FIG. 1 is a schematic structural diagram of a subframe according to the prior art;

FIG. 2 is a flowchart of a data transmission method according to an embodiment of the present invention;

FIG. 3 is a flowchart of another data transmission method according to an embodiment of the present invention;

FIG. 4(a) is a schematic structural diagram of a first-type subframe according to an embodiment of the present invention;

FIG. 4(b) is a schematic structural diagram of a second-type subframe according to an embodiment of the present invention;

FIG. 5(a) is a schematic structural diagram of a third-type subframe according to an embodiment of the present invention;

FIG. 5(b) is a schematic structural diagram of a fourth-type subframe according to an embodiment of the present invention;

DETAILED DESCRIPTION OF ILLUSTRATIVE EMBODIMENTS

Figure 6:
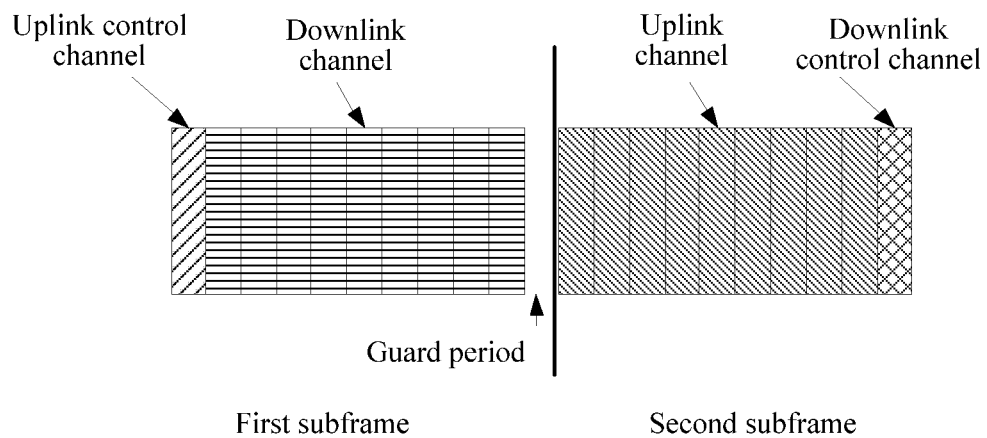
FIG. 6 is a schematic structural diagram of a type of two consecutive subframes according to an embodiment of the present invention.

To make the objectives, technical solutions, and advantages of the embodiments of present invention clearer, the following further describes the embodiments of the present invention in detail with reference to the accompanying drawings.

FIG. 2 is a flowchart of a data transmission method according to an embodiment of the present invention. Referring to FIG. 2, the method includes the following steps.

Step 201: Determine a type of a first subframe for data transmission, where the type of the first subframe is a first-type subframe, a second-type subframe, a third-type subframe, or a fourth-type subframe.

The first-type subframe includes an uplink control channel and a downlink channel, and the uplink control channel of the first-type subframe is located before the downlink channel of the first-type subframe.

The second-type subframe includes an uplink control channel and a downlink channel, the uplink control channel of the second-type subframe is located after the downlink channel of the second-type subframe, and there is a guard period between the uplink control channel of the second-type subframe and the downlink channel of the second-type subframe.

The third-type subframe includes an uplink channel and a downlink control channel, and the uplink channel of the third-type subframe is located before the downlink control channel of the third-type subframe.

The fourth-type subframe includes an uplink channel and a downlink control channel, the uplink channel of the fourth-type subframe is located after the downlink control channel of the fourth-type subframe, and there is a guard period between the uplink channel of the fourth-type subframe and the downlink control channel of the fourth-type subframe.

Step 202: Transmit data in the first subframe according to the determined type of the first subframe.

In this embodiment of the present invention, a type of a first subframe for data transmission is determined, where the type of the first subframe is a first-type subframe, a second-type subframe, a third-type subframe, or a fourth-type subframe. An uplink control channel of the first-type subframe is located before a downlink channel of the first-type subframe, and a guard period is not included between the uplink control channel of the first-type subframe and the downlink channel of the first-type subframe, thereby reducing a quantity of times of switching, and further reducing a quantity of guard periods. An uplink control channel of the second-type subframe is located after a downlink channel of the second-type subframe, there is a guard period between the uplink control channel of the second-type subframe and the downlink channel of the second-type subframe, and only one time of switching between uplink transmission and downlink transmission is performed, thereby reducing the quantity of times of switching, and further reducing the quantity of guard periods. An uplink channel of the third-type subframe is located before a downlink control channel of the third-type subframe, and a guard period is not included between the uplink channel of the third-type subframe and the downlink control channel of the third-type subframe, thereby reducing the quantity of times of switching, and further reducing the quantity of guard periods. An uplink channel of the fourth-type subframe is located after a downlink control channel of the fourth-type subframe, there is a guard period between the uplink channel of the fourth-type subframe and the downlink control channel of the fourth-type subframe, and only one time of switching between uplink transmission and downlink transmission is performed, thereby reducing the quantity of times of switching, and further reducing the quantity of guard periods. In this way, utilization of wireless resources is improved.

Optionally, the method further includes: transmitting data in a second subframe after the first subframe, where the second subframe is adjacent to the first subframe, where if a data transmission direction at a start moment of the second subframe is different from a data transmission direction at an end moment of the first subframe, a guard period is further included between the first subframe and the second subframe; and if the data transmission direction at the start moment of the second subframe is the same as the data transmission direction at the end moment of the first subframe, a time period is not included between the first subframe and the second subframe.

Optionally, the method further includes: transmitting data in a second subframe after the first subframe, where the second subframe is adjacent to the first subframe, where if a data transmission direction at a start moment of the second subframe is an uplink and a data transmission direction at an end moment of the first subframe is a downlink, a guard period is further included between the first subframe and the second subframe.

Optionally, the determining a type of a first subframe for data transmission includes: determining, according to a first preset period, that the type of the first subframe is the first-type subframe or the second-type subframe; or determining, according to a second preset period, that the type of the first subframe is the third-type subframe or the fourth-type subframe.

Optionally, when it is determined, according to the first preset period, that the type of the first subframe is the first-type subframe or the second-type subframe, the first subframe is used to transmit one or a combination of a synchronization signal, a broadcast signal, or a discovery reference signal, where the broadcast signal is used to carry information about the first preset period and/or the second preset period.

Optionally, when the first preset period and the second preset period are the same, the broadcast signal indicates the first preset period or the second preset period, the broadcast signal further indicates an offset between the first preset period and the second preset period, and the offset is used to indicate a subframe number difference between subframes corresponding to the first preset period and the second preset period.

Optionally, an uplink control channel or a downlink control channel of the first subframe carries indication information, the indication information is used to indicate a subframe type of a $k^{th}$ subframe after the first subframe, and k is a positive integer.

Optionally, a first preset quantity of consecutive symbols in the downlink channel of the first-type subframe or a first preset quantity of consecutive symbols in the downlink channel of the second-type subframe are used to transmit a downlink control channel, and a symbol in the downlink channel of the first-type subframe other than the first preset quantity of symbols or a symbol in the downlink channel of the second-type subframe other than the first preset quantity of symbols is used to transmit downlink data, where the first preset quantity of consecutive symbols are a first preset quantity of symbols arranged first in a time order, or the first preset quantity of consecutive symbols are a first preset quantity of symbols arranged last in a time order.

Optionally, a first frequency band set in the downlink channel of the first-type subframe or a first frequency band set in the downlink channel of the second-type subframe is used to transmit downlink data, and a second frequency band set in the downlink channel of the first-type subframe or a second frequency band set in the downlink channel of the second-type subframe is used to transmit a downlink control channel.

Optionally, a first preset quantity of consecutive symbols in the downlink channel of the first-type subframe or a first preset quantity of consecutive symbols in the downlink channel of the second-type subframe are used to transmit a downlink control channel, a third frequency band set in a symbol in the downlink channel of the first-type subframe other than the first preset quantity of symbols or a third frequency band set in a symbol in the downlink channel of the second-type subframe other than the first preset quantity of symbols is used to transmit downlink data, and a fourth frequency band set in the symbol in the downlink channel of the first-type subframe or the downlink channel of the second-type subframe other than the first preset quantity of symbols or a fourth frequency band set in the symbol in the downlink channel of the second-type subframe other than the first preset quantity of symbols is used to transmit a downlink control channel.

Optionally, a second preset quantity of consecutive symbols in the uplink channel of the third-type subframe or a second preset quantity of consecutive symbols in the uplink channel of the fourth-type subframe are used to transmit an uplink control channel, and a symbol in the uplink channel of the third-type subframe other than the second preset quantity of symbols or a symbol in the uplink channel of the fourth-type subframe other than the second preset quantity of symbols is used to transmit uplink data, where the second preset quantity of consecutive symbols are a second preset quantity of symbols arranged first in a time order, or the second preset quantity of consecutive symbols are a second preset quantity of symbols arranged last in a time order.

Optionally, a first frequency band set in the uplink channel of the third-type subframe or a first frequency band set in the uplink channel of the fourth-type subframe is used to transmit uplink data, and a second frequency band set in the uplink channel of the third-type subframe or a second frequency band set in the uplink channel of the fourth-type subframe is used to transmit an uplink control channel.

Optionally, a second preset quantity of consecutive symbols in the uplink channel of the third-type subframe or a second preset quantity of consecutive symbols in the uplink channel of the fourth-type subframe are used to transmit an uplink control channel, a third frequency band set in a symbol in the uplink channel of the third-type subframe other than the second preset quantity of symbols or a third frequency band set in a symbol in the uplink channel of the fourth-type subframe other than the second preset quantity of symbols is used to transmit uplink data, and a fourth frequency band set in the symbol in the uplink channel of the third-type subframe other than the second preset quantity of symbols or a fourth frequency band set in the symbol in the uplink channel of the fourth-type subframe other than the second preset quantity of symbols is used to transmit an uplink control channel.

Any combination of all the foregoing optional technical solutions can form an optional embodiment of the present invention, and no further details are described in this embodiment of the present invention.

FIG. 3 is a flowchart of a data transmission method according to an embodiment of the present invention. Referring to FIG. 3, the method includes the following steps.

Step 301: Determine a type of a first subframe for data transmission, where the type of the first subframe is a first-type subframe, a second-type subframe, a third-type subframe, or a fourth-type subframe.

The first-type subframe includes an uplink control channel and a downlink channel, and the uplink control channel of the first-type subframe is located before the downlink channel of the first-type subframe. The second-type subframe includes an uplink control channel and a downlink channel, the uplink control channel of the second-type subframe is located after the downlink channel of the second-type subframe, and there is a guard period between the uplink control channel of the second-type subframe and the downlink channel of the second-type subframe. The third-type subframe includes an uplink channel and a downlink control channel, and the uplink channel of the third-type subframe is located before the downlink control channel of the third-type subframe. The fourth-type subframe includes an uplink channel and a downlink control channel, the uplink channel of the fourth-type subframe is located after the downlink control channel of the fourth-type subframe, and there is a guard period between the uplink channel of the fourth-type subframe and the downlink control channel of the fourth-type subframe. For example, as shown in FIG. 4 and FIG. 5, FIG. 4(a) shows a first-type subframe, FIG. 4(b) shows a second-type subframe, FIG. 5(a) shows a third-type subframe, and FIG. 5(b) shows a fourth-type subframe.

When data is transmitted between UE and a base station, the data may be transmitted by using a subframe, and each subframe has same duration. Therefore, the base station may set a first subframe for data transmission to be a first-type subframe, a second-type subframe, a third-type subframe, or a fourth-type subframe. For the first-type subframe, there is no guard period between an uplink control channel of the first-type subframe and a downlink channel of the first-type subframe, thereby reducing a quantity of guard periods, increasing a time for data transmission in a subframe, and further improving utilization of radio resources. For the second-type subframe, there is a guard period between an uplink control channel of the second-type subframe and a downlink channel of the second-type subframe, that is, one time of switching from downlink transmission to uplink transmission is performed in the second-type subframe, thereby reducing a quantity of times of switching, reducing the quantity of guard periods, increasing the time for data transmission in a subframe, and further improving the utilization of radio resources. For the third-type subframe, there is no guard period between an uplink channel of the third-type subframe and a downlink control channel of the third-type subframe, thereby reducing the quantity of guard periods, increasing the time for data transmission in a subframe, and further improving the utilization of radio resources. For the fourth-type subframe, there is a guard period between an uplink channel of the fourth-type subframe and a downlink control channel of the fourth-type subframe, that is, one time of switching from downlink transmission to uplink transmission is performed in the fourth-type subframe, thereby reducing the quantity of times of switching, reducing the quantity of guard periods, increasing the time for data transmission in a subframe, and further improving the utilization of radio resources.

An uplink control channel may be used to transmit at least one type of the following information: an acknowledgment/negative acknowledgment (ACK/NACK) feedback for reception of downlink data, a channel state information feedback (CSI) for a quality measurement result of a downlink channel, or a scheduling request. Certainly, an uplink control channel may also be used to transmit other information, which is not enumerated in this embodiment of the present invention.

It should be noted that, in this embodiment of the present invention, all guard periods for switching from uplink transmission to downlink transmission may be equal, and all guard periods for switching from downlink transmission to uplink transmission may also be equal. For ease of description, a guard period for switching from uplink transmission to downlink transmission is referred to as a first time period, and a guard period for switching from downlink transmission to uplink transmission is referred to as a second time period. The first time period and the second time period may be the same, or may be different. This is not specifically limited in this embodiment of the present invention.

In addition, when a network device receives data, to accurately receive the data, the network device needs to determine whether an uplink or a downlink is in the front in a subframe. Therefore, in this embodiment of the present invention, preferably, a subframe for data transmission may be determined as the first-type subframe or the third-type subframe. Certainly, a subframe for data transmission may also be determined as the second-type subframe or the fourth-type subframe. In this way, an order of an uplink and a downlink in a subframe may be consistently fixed, so that the network device omits a determining process, therefore reducing design complexity of the network device.

In another embodiment of the present invention, the determining a type of a first subframe for data transmission includes: determining, according to a first preset period, that the type of the first subframe is the first-type subframe or the second-type subframe; or determining, according to a second preset period, that the type of the first subframe is the third-type subframe or the fourth-type subframe. That is, in multiple subframes for data transmission, a fixed first-type subframe or second-type subframe is allocated every first preset period, and a fixed third-type subframe or fourth-type subframe is allocated every second preset period. Another subframe of the multiple subframes may be dynamically allocated as a first-type subframe, a second-type subframe, a third-type subframe, or a fourth-type subframe. Certainly, the another subframe may also be allocated as a subframe of another type. This is not specifically limited in this embodiment of the present invention.

When the another subframe of the multiple subframes is dynamically allocated as a first-type subframe, a second-type subframe, a third-type subframe, or a fourth-type subframe, a type of the another subframe may be determined based on a data amount of downlink transmission and a data amount of uplink transmission. For example, when the data amount of downlink transmission is greater than the data amount of uplink transmission, for the another subframe of the multiple subframes, a quantity of subframes allocated as a first-type subframe or a second-type subframe is greater than a quantity of subframes allocated as a third-type subframe or a fourth-type subframe. When the data amount of downlink transmission is less than the data amount of uplink transmission, for the another subframe of the multiple subframes, the quantity of subframes allocated as a first-type subframe or a second-type subframe is less than the quantity of subframes allocated as a third-type subframe or a fourth-type subframe. When the data amount of downlink transmission is equal to the data amount of uplink transmission, another factor may also be considered to perform allocation. This is not specifically limited in this embodiment of the present invention.

When it is determined, according to the first preset period, that the type of the first subframe is the first-type subframe or the second-type subframe, the first subframe may be used to transmit one or a combination of a synchronization signal, a broadcast signal, or a discovery reference signal to the UE, where the broadcast signal is used to carry information about the first preset period and/or the second preset period. The synchronization signal is used for synchronization between a time domain and a frequency domain, and is further used to obtain a starting position and the like of each frame and each subframe. The broadcast signal is further used to broadcast system information of a cell, for example, an identifier of the cell, an antenna configuration of the cell, and a number of a current frame. The discovery reference signal is used to indicate a status (turned off or on) of a cell, measure signal energy of the cell, and the like.

In addition, the first preset period and the second preset period may be the same, or may be different. When the first preset period and the second preset period are different, the base station may separately send the first preset period and the second preset period to the UE by using a subframe corresponding to the first preset period. When the first preset period and the second preset period are the same, the base station may indicate the first preset period or the second preset period to the UE by using the foregoing broadcast signal, and the broadcast signal is further used to indicate an offset between the first preset period and the second preset period to the UE, where the offset is used to indicate a subframe number difference between subframes corresponding to the first preset period and the second preset period. For example, the offset is 2; therefore, the second subframe after a subframe corresponding to each first preset period is a subframe corresponding to the second preset period.

The first preset period and the second preset period are sent to the UE by using a subframe corresponding to the first preset period, or the first preset period or the second preset period, and the offset between the first preset period and the second preset period are sent to the UE, so that UE that initially accesses a cell or UE that is switched to a current cell from a neighboring cell may obtain a sending time of a subframe corresponding to the first preset period and a sending time of a subframe corresponding to the second preset period.

In addition, in this embodiment of the present invention, the UE may be notified of a subframe type by using the following mechanism of broadcasting a subframe type in advance, so that the UE may obtain the subframe type in advance and therefore may correctly send data and receive data. Specifically, for the first subframe, a subframe type of a $k^{th}$ subframe after the first subframe may be obtained, and indication information may be carried in an uplink control channel or a downlink control channel of the first subframe, where the indication information is used to indicate a subframe type of the $k^{th}$ subframe after the first subframe. k is a specified value, and k is a positive integer.

It should be noted that, when the UE is notified of the subframe type of the $k^{th}$ subframe after the first subframe by using the mechanism of broadcasting a subframe type in advance, the UE may be notified by using a specified broadcast signal. For a subframe corresponding to the first preset period, the specified broadcast signal may be the broadcast signal mentioned above, or may be a broadcast signal other than the broadcast signal mentioned above. This is not specifically limited in this embodiment of the present invention.

Step 302: Transmit data in the first subframe according to the determined type of the first subframe.

After the type of the first subframe is determined, it may be determined whether an uplink or a downlink is in the front in the first subframe, and then data may be received or data may be sent correctly, and correctness of data transmission in the first subframe may be ensured.

Step 303: Transmit data in a second subframe after the first subframe, where the second subframe is adjacent to the first subframe.

Figure 7:
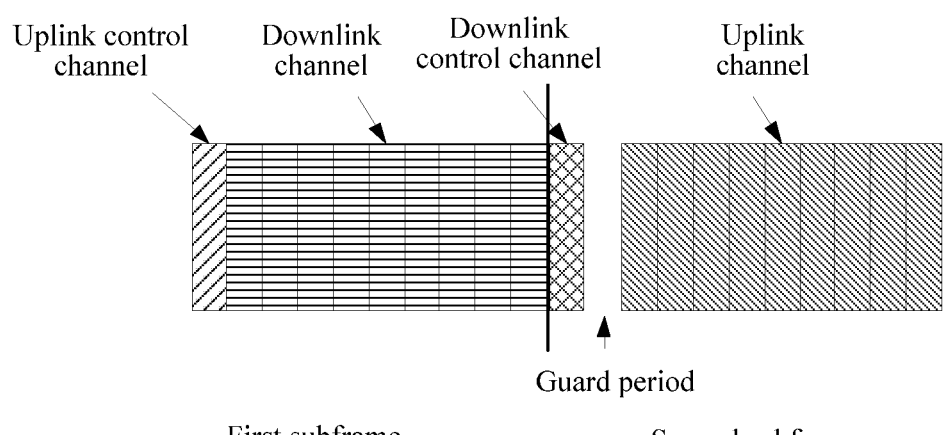
FIG. 7 is a schematic structural diagram of another type of two consecutive subframes according to an embodiment of the present invention.

If a data transmission direction at a start moment of the second subframe is different from a data transmission direction at an end moment of the first subframe, a guard period is further included between the first subframe and the second subframe. If the data transmission direction at the start moment of the second subframe is the same as the data transmission direction at the end moment of the first subframe, a time period is not included between the first subframe and the second subframe. As shown in FIG. 6, the subframe type of the first subframe is the first-type subframe, the data transmission direction at the end moment of the first subframe is a downlink, a subframe type of the second subframe is the third type, and the data transmission direction at the start moment of the second subframe is an uplink. In this case, a guard period is further included between the first subframe and the second subframe. As shown in FIG. 7, the subframe type of the first subframe is the first-type subframe, the data transmission direction at the end moment of the first subframe is a downlink, the subframe type of the second subframe is the fourth type, and the data transmission direction at the start moment of the second subframe is a downlink. In this case, there is no switching between uplink transmission and downlink transmission between the first subframe and the second subframe. Therefore, a guard period is not included between the first subframe and the second subframe, thereby further reducing a quantity of guard periods, reducing system overheads, and improving efficiency of wireless resources.

Figure 8:
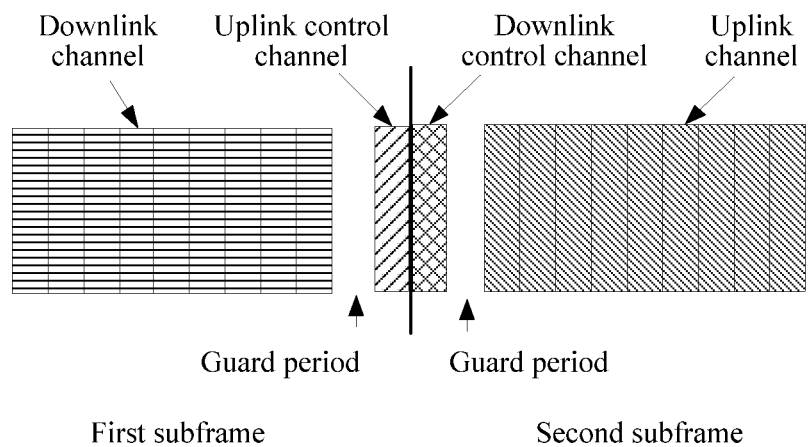
FIG. 8 is a schematic structural diagram of still another type of two consecutive subframes according to an embodiment of the present invention.

Further, an uplink lead time is configured for the UE, that is, when the UE transmits data to the base station, there is a lead time for uplink transmission. Within the lead time, a network device (the UE or the base station) may perform switching between uplink transmission and downlink transmission. Therefore, a guard period may not be included during switching to downlink transmission from uplink transmission, thereby further reducing the quantity of guard periods. That is, if the data transmission direction at the start moment of the second subframe is an uplink and the data transmission direction at the end moment of the first subframe is a downlink, a guard period is further included between the first subframe and the second subframe. If the data transmission direction at the start moment of the second subframe is a downlink and the data transmission direction at the end moment of the first subframe is an uplink, a guard period may not be included between the first subframe and the second subframe, as shown in FIG. 8. Certainly, a guard period may also be included between the first subframe and the second subframe, but the guard period may be excessively short. This is not specifically limited in this embodiment of the present invention.

It should be noted that, in this embodiment of the present invention, when a time period is further included between the first subframe and the second subframe, the time period is obtained by shortening a time for data transmission in the first subframe, and has no impact on a time for data transmission in the second subframe. For example, as shown in FIG. 5, a guard period is further included between the first subframe and the second subframe, and the guard period is obtained by shortening a time of a downlink channel of the first subframe, and has no impact on a time of an uplink channel of the second subframe.

Figure 9:
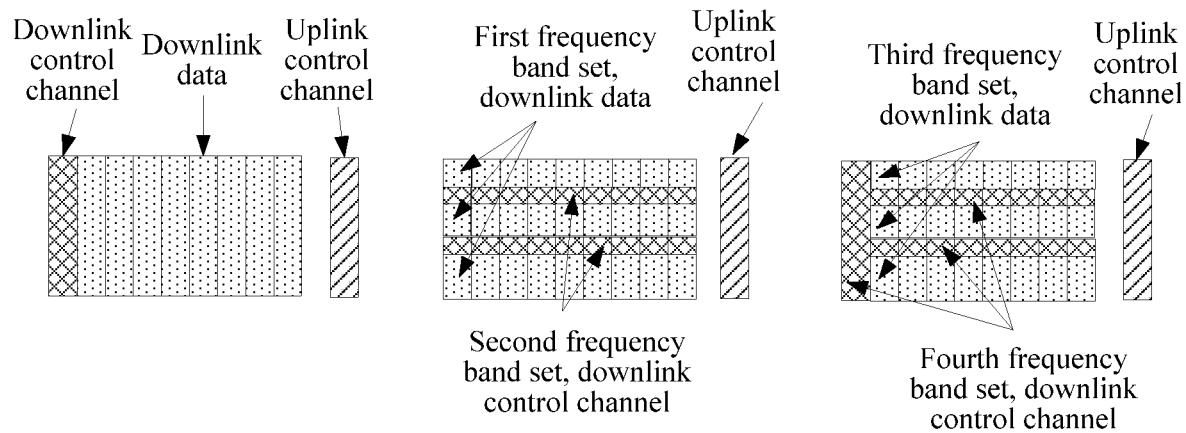
FIG. 9(a) is a schematic structural diagram of another second-type subframe according to an embodiment of the present invention.
FIG. 9(b) is a schematic structural diagram of still another second-type subframe according to an embodiment of the present invention.
FIG. 9(c) is a schematic structural diagram of yet another second-type subframe according to an embodiment of the present invention.

In this embodiment of the present invention, specific structures of the first-type subframe, the second-type subframe, the third-type subframe, and the fourth-type subframe may further be designed. The specific structures of the first-type subframe and the second-type subframe may be: A first preset quantity of consecutive symbols in the downlink channel of the first-type subframe or a first preset quantity of consecutive symbols in the downlink channel of the second-type subframe are used to transmit a downlink control channel, and a symbol in the downlink channel of the first-type subframe other than the first preset quantity of symbols or a symbol in the downlink channel of the second-type subframe other than the first preset quantity of symbols is used to transmit downlink data, where the first preset quantity of consecutive symbols are a first preset quantity of symbols arranged first in a time order, or the first preset quantity of consecutive symbols are a first preset quantity of symbols arranged last in a time order. FIG. 9(a) shows a second-type subframe. It is assumed that a first preset quantity of consecutive symbols are one symbol arranged first in a time order, that is, the first symbol in FIG. 9(a) is used to transmit a downlink control channel, and symbols in downlink channels other than the first symbol in FIG. 9(a) are used to transmit downlink data.

Alternatively, a first frequency band set in the downlink channel of the first-type subframe or a first frequency band set in the downlink channel of the second-type subframe is used to transmit downlink data, and a second frequency band set in the downlink channel of the first-type subframe or a second frequency band set in the downlink channel of the second-type subframe is used to transmit a downlink control channel. The second frequency band set in the downlink channel of the first-type subframe is a frequency band in a frequency band of the downlink channel of the first-type subframe other than the first frequency band set in the downlink channel of the first-type subframe, and the second frequency band set in the downlink channel of the second-type subframe is a frequency band in a frequency band of the downlink channel of the second-type subframe other than the first frequency band set in the downlink channel of the second-type subframe. That is, the first frequency band set and the second frequency band set in the downlink channel of the first-type subframe constitute the whole frequency band of the downlink channel of the first-type subframe, and the first frequency band set and the second frequency band set in the downlink channel of the second-type subframe constitute the whole frequency band of the downlink channel of the second-type subframe. FIG. 9(b) shows a second-type subframe. A first frequency band set in downlink channels in FIG. 9(b) is used to transmit downlink data, and a second frequency band set in the downlink channels in FIG. 9(b) is used to transmit a downlink control channel.

Alternatively, a first preset quantity of consecutive symbols in the downlink channel of the first-type subframe or a first preset quantity of consecutive symbols in the downlink channel of the second-type subframe are used to transmit a downlink control channel, a third frequency band set in a symbol in the downlink channel of the first-type subframe other than the first preset quantity of symbols or a third frequency band set in a symbol in the downlink channel of the second-type subframe other than the first preset quantity of symbols is used to transmit downlink data, and a fourth frequency band set in the symbol in the downlink channel of the first-type subframe other than the first preset quantity of symbols or a fourth frequency band set in the symbol in the downlink channel of the second-type subframe other than the first preset quantity of symbols is also used to transmit a downlink control channel. For ease of description, the symbol in the downlink channel of the first-type subframe other than the first preset quantity of symbols or the symbol in the downlink channel of the second-type subframe other than the first preset quantity of symbols is referred to as a first remaining downlink symbol. The fourth frequency band set in the first remaining downlink symbol is a frequency band in a frequency band of the first remaining downlink symbol other than the third frequency band set in the first remaining downlink symbol, that is, the third frequency band set and the fourth frequency band set in the first remaining downlink symbol constitute the whole frequency band of the first remaining downlink symbol. FIG. 9(c) shows a second-type subframe. It is assumed that a first preset quantity of consecutive symbols are one symbol arranged first in a time order, that is, the first symbol in FIG. 9(c) is used to transmit a downlink control channel, and symbols in downlink channels other than the first symbol in FIG. 9(c) are first remaining downlink symbols, a third frequency band set in the first remaining downlink symbols is used to transmit downlink data, and a fourth frequency band set in the first remaining downlink symbols is used to transmit a downlink control channel.

Figure 10:
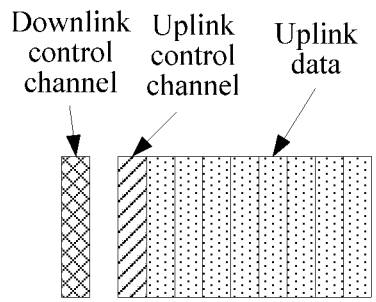
FIG. 10(a) is a schematic structural diagram of another fourth-type subframe according to an embodiment of the present invention.
FIG. 10(b) is a schematic structural diagram of still another fourth-type subframe according to an embodiment of the present invention.
FIG. 10(c) is a schematic structural diagram of yet another fourth-type subframe according to an embodiment of the present invention.
Figure 10:
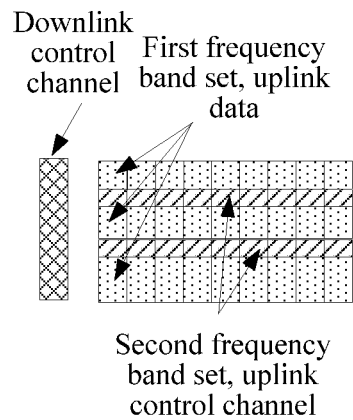
Figure 10:
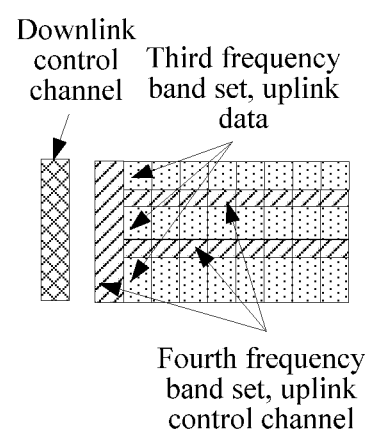

The specific structures of the third-type subframe and the fourth-type subframe may be: A second preset quantity of consecutive symbols in the uplink channel of the third-type subframe or a second preset quantity of consecutive symbols in the uplink channel of the fourth-type subframe are used to transmit an uplink control channel, and a symbol in the uplink channel of the third-type subframe other than the second preset quantity of symbols or a symbol in the uplink channel of the fourth-type subframe other than the second preset quantity of symbols is used to transmit uplink data, where the second preset quantity of consecutive symbols are a second preset quantity of symbols arranged first in a time order, or the second preset quantity of consecutive symbols are a second preset quantity of symbols arranged last in a time order. FIG. 10(a) shows a fourth-type subframe. It is assumed that a second preset quantity of consecutive symbols are one symbol arranged first in a time order, that is, the first symbol in uplink channels in FIG. 10(a) is used to transmit an uplink control channel, and symbols in the uplink channels other than the first symbol in FIG. 10(a) are used to transmit uplink data.

Alternatively, a first frequency band set in the uplink channel of the third-type subframe or a first frequency band set in the uplink channel of the fourth-type subframe is used to transmit uplink data, and a second frequency band set in the uplink channel of the third-type subframe or a second frequency band set in the uplink channel of the fourth-type subframe is used to transmit an uplink control channel. The second frequency band set in the uplink channel of the third-type subframe is a frequency band in a frequency band of the uplink channel of the third-type subframe other than the first frequency band set in the uplink channel of the third-type subframe, and the second frequency band set in the uplink channel of the fourth-type subframe is a frequency band in a frequency band of the uplink channel of the fourth-type subframe other than the first frequency band set in the uplink channel of the fourth-type subframe. That is, the first frequency band set and the second frequency band set in the uplink channel of the third-type subframe constitute the whole frequency band of the third-type subframe, and the first frequency band set and the second frequency band set in the uplink channel of the fourth-type subframe constitute the whole frequency band of the fourth-type subframe. FIG. 10(b) shows a fourth-type subframe. A first frequency band set in uplink channels in FIG. 10(b) is used to transmit uplink data, and a second frequency band set in the uplink channels in FIG. 10(b) is used to transmit an uplink control channel.

Alternatively, a second preset quantity of consecutive symbols in the uplink channel of the third-type subframe or a second preset quantity of consecutive symbols in the uplink channel of the fourth-type subframe are used to transmit an uplink control channel, a third frequency band set in a symbol in the uplink channel of the third-type subframe other than the second preset quantity of symbols or a third frequency band set in a symbol in the uplink channel of the fourth-type subframe other than the second preset quantity of symbols is used to transmit uplink data, and a fourth frequency band set in the symbol in the uplink channel of the third-type subframe other than the second preset quantity of symbols or a fourth frequency band set in the symbol in the uplink channel of the fourth-type subframe other than the second preset quantity of symbols is used to transmit an uplink control channel. For ease of description, the symbol in the uplink channel of the third-type subframe other than the second preset quantity of symbols or the symbol in the uplink channel of the fourth-type subframe other than the second preset quantity of symbols is referred to as a first remaining uplink symbol. The fourth frequency band set in the first remaining uplink symbol is a frequency band in a frequency band of the first remaining uplink symbol other than the third frequency band set in the first remaining uplink symbol, that is, the third frequency band set and the fourth frequency band set in the first remaining uplink symbol constitute the whole frequency band of the first remaining uplink symbol. FIG. 10(c) shows a fourth-type subframe. It is assumed that a second preset quantity of consecutive symbols are one symbol arranged first in a time order, that is, the first symbol in uplink channels in FIG. 10(c) is used to transmit an uplink control channel, and symbols in the uplink channels other than the first symbol in FIG. 10(c) are first remaining uplink symbols, a third frequency band set in the first remaining uplink symbols is used to transmit uplink data, and a fourth frequency band set in the first remaining uplink symbols is used to transmit an uplink control channel.

The first preset quantity is set in advance, the first preset quantity is less than a quantity of symbols in the downlink channel of the first-type subframe, or the first preset quantity is less than a quantity of symbols in the downlink channel of the second-type subframe, and the first preset quantity may be 1, 2, 3, or the like. This is not specifically limited in this embodiment of the present invention. Similarly, the second preset quantity is also set in advance, the second preset quantity is less than a quantity of symbols in the uplink channel of the third-type subframe, or the second preset quantity is less than a quantity of symbols in the uplink channel of the fourth-type subframe, and the second preset quantity may also be 1, 2, 3, or the like. The second preset quantity and the second preset quantity may be equal or may be unequal. This is also not specifically limited in this embodiment of the present invention.

In addition, in the structural diagrams of subframes involved in this embodiment of the present invention, a horizontal direction indicates time, and a vertical direction indicates frequency. Therefore, the first frequency band set and the second frequency band set in the downlink channel of the first-type subframe may be located in any frequency position in the frequency band of the downlink channel of the first-type subframe. Preferably, the first frequency band set in the downlink channel of the first-type subframe may include a frequency band that is in the frequency band of the downlink channel of the first-type subframe and that differs from a maximum frequency of the downlink channel of the first-type subframe by a first frequency value and a frequency band that is in the frequency band of the downlink channel of the first-type subframe and that differs from a minimum frequency of the downlink channel of the first-type subframe by a second frequency value, and the second frequency band set in the downlink channel of the first-type subframe may include a frequency band that is in the frequency band of the downlink channel of the first-type subframe other than the first frequency band. In this way, the first frequency band set in the downlink channel of the first-type subframe is located on two sides of bandwidth of the downlink channel of the first-type subframe, that is, the first frequency band set in the downlink channel of the first-type subframe includes a high frequency band of the downlink channel of the first-type subframe and a low frequency band of the downlink channel of the first-type subframe. In this way, when a downlink control channel is controlled by using both the high frequency band and the low frequency band, a probability that transmission fails in both the high frequency band and the low frequency band is relatively low, thereby improving a transmission success rate of a downlink control channel, and also improving a frequency diversity gain. Similarly, a design of the first frequency band set and the second frequency band set in the downlink channel of the second-type subframe, a design of the first frequency band set and the second frequency band set in the uplink channel of the third-type subframe, and a design of the first frequency band set and the second frequency band set in the uplink channel of the fourth-type subframe are similar to that of the first frequency band set and the second frequency band set in the downlink channel of the first-type subframe, and details are not described herein again in this embodiment of the present invention.

In addition, when a downlink control channel is transmitted in the manner in FIG. 9(c), the transmission success rate of a downlink control channel can be further improved, and the frequency diversity gain is also further improved. Similarly, a design of the third frequency band set and the fourth frequency band set in the first remaining downlink symbol and a design of the third frequency band set and the fourth frequency band set in the first remaining uplink symbol are similar to that of the first frequency band set and the second frequency band set in the downlink channel of the first-type subframe, and details are not described herein again in this embodiment of the present invention.

In this embodiment of the present invention, the downlink control channel may be a normal downlink control channel, or may be an enhanced downlink control channel. This is not specifically limited in this embodiment of the present invention. In addition, the symbol involved in this embodiment of the present invention may be an OFDM symbol, or may be an SC-FDMA symbol, a single carrier symbol, or the like. This is also not specifically limited in this embodiment of the present invention.

Optionally, if data transmitted by the first-type subframe includes a downlink control channel and downlink data and the first-type subframe does not include the uplink control channel, time and frequency resources occupied by the uplink control channel and the downlink channel of the first-type subframe form a new downlink channel of the first-type subframe, or if data transmitted by the second-type subframe includes a downlink control channel and downlink data and the second-type subframe does not include the uplink control channel, the guard period is not included between the uplink control channel and the downlink channel of the second-type subframe, time and frequency resources occupied by the downlink channel and the guard period of the second-type subframe are used to transmit downlink data, and time and frequency resources occupied by the uplink control channel, the downlink channel, and the guard period of the second-type subframe form a new downlink channel of the second-type subframe, and there are only the new downlink channels in the first-type subframe and the second-type subframe. In this case, the structure of the first-type subframe and the structure of the second-type subframe are the same.

For the first-type subframe, the specific structure of the first-type subframe may be: A first preset quantity of consecutive symbols in the new downlink channel of the first-type subframe are used to transmit a downlink control channel, and a symbol in the downlink channel of the first-type subframe other than the first preset quantity of symbols is used to transmit downlink data, where the first preset quantity of consecutive symbols in the new downlink channel of the first-type subframe are a first preset quantity of symbols arranged first in a time order, or the first preset quantity of consecutive symbols in the downlink channel of the first-type subframe are a first preset quantity of symbols arranged last in a time order. FIG. 11(a) shows a first-type subframe. A first preset quantity of consecutive symbols in a new downlink channel of the first-type subframe are one symbol arranged first in a time order, that is, the first symbol in FIG. 11(a), and the first symbol is used to transmit a downlink control channel, and symbols other than the first symbol in FIG. 11(a) are used to transmit downlink data.

Alternatively, a fifth frequency band set in the new downlink channel of the first-type subframe is used to transmit downlink data, and a sixth frequency band set in the new downlink channel of the first-type subframe is used to transmit a downlink control channel. The sixth frequency band set in the new downlink channel of the first-type subframe is a frequency band in a frequency band of the new downlink channel of the first-type subframe other than the fifth frequency band set in the new downlink channel of the first-type subframe, that is, the fifth frequency band set and the sixth frequency band set in the new downlink channel of the first-type subframe constitute the whole frequency band of the new downlink channel of the first-type subframe. FIG. 11(b) shows a first-type subframe.

Alternatively, a first preset quantity of consecutive symbols in the new downlink channel of the first-type subframe are used to transmit a downlink control channel, a seventh frequency band set in symbols in the new downlink channel of the first-type subframe other than the first preset quantity of symbols is used to transmit downlink data, and an eighth frequency band set in symbols in the new downlink channel of the first-type subframe other than the first preset quantity of symbols is used to transmit a downlink control channel. For ease of description, a symbol in the new downlink channel of the first-type subframe other than the first preset quantity of symbols is referred to as a second remaining downlink symbol, and the eighth frequency band set in the second remaining downlink symbol is a frequency band in a frequency band of the second remaining downlink symbol other than the seventh frequency band set in the second remaining downlink symbol, that is, the seventh frequency band set and the eighth frequency band set in the second remaining downlink symbol constitute the whole frequency band of the second remaining downlink symbol. FIG. 11(c) shows a first-type subframe. A first preset quantity of consecutive symbols in a new downlink channel of the first-type subframe are one symbol arranged first in a time order, that is, the first symbol in FIG. 11(c), and the first symbol is used to transmit a downlink control channel, and symbols other than the first symbol in FIG. 11(c) are second remaining downlink symbols, a seventh frequency band set in the second remaining downlink symbols is used to transmit downlink data, and an eighth frequency band set in the second remaining downlink symbols is used to transmit a downlink control channel.

Optionally, if data transmitted by the third-type subframe includes an uplink control channel and uplink data and the third-type subframe does not include the downlink control channel, time and frequency resources occupied by the downlink control channel and the uplink channel of the third-type subframe form a new uplink channel of the third-type subframe, or if data transmitted by the fourth-type subframe includes an uplink control channel and uplink data and the fourth-type subframe does not include the downlink control channel, the guard period is not included between the downlink control channel and the uplink channel of the fourth-type subframe, and time and frequency resources occupied by the downlink control channel, the uplink channel, and the guard period of the fourth-type subframe form a new uplink channel of the fourth-type subframe, and there are only the new uplink channels in the third-type subframe and the fourth-type subframe. In this case, the structures of the third-type subframe and the fourth-type subframe are the same.

Figure 12:
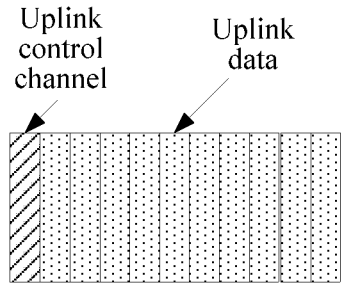
FIG. 12(a) is a schematic structural diagram of another third-type subframe according to an embodiment of the present invention.
FIG. 12(b) is a schematic structural diagram of another third-type subframe according to an embodiment of the present invention.
FIG. 12(c) is a schematic structural diagram of another third-type subframe according to an embodiment of the present invention.
Figure 12:
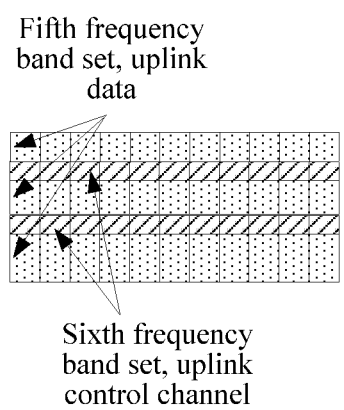
Figure 12:
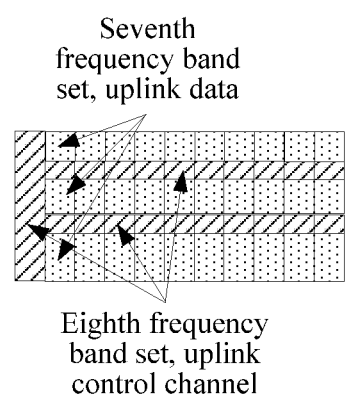

For the third-type subframe, the specific structure of the third-type subframe may be: A second preset quantity of consecutive symbols in the new uplink channel of the third-type subframe are used to transmit an uplink control channel, and a symbol in the new uplink channel of the third-type subframe other than the second preset quantity of symbols is used to transmit uplink data, where the second preset quantity of consecutive symbols in the new uplink channel of the third-type subframe are a second preset quantity of symbols arranged first in a time order, or the second preset quantity of consecutive symbols are a second preset quantity of symbols arranged last in a time order. As shown in FIG. 12(a), a second preset quantity of consecutive symbols in a new uplink channel of a third-type subframe are one symbol arranged first in a time order, that is, the first symbol in FIG. 12(a), and the first symbol is used to transmit an uplink control channel, and symbols other than the first symbol are used to transmit uplink data.

Alternatively, a fifth frequency band set in the new uplink channel of the third-type subframe is used to transmit uplink data, and a sixth frequency band set in the new uplink channel of the third-type subframe is used to transmit an uplink control channel. The sixth frequency band set in the new uplink channel of the third-type subframe is a frequency band in a frequency band of the new uplink channel of the third-type subframe other than the fifth frequency band set in the new uplink channel of the third-type subframe, that is, the fifth frequency band set and the sixth frequency band set in the new uplink channel of the third-type subframe constitute the whole frequency band of the new uplink channel of the third-type subframe. FIG. 12(b) shows a third-type subframe.

Alternatively, a second preset quantity of consecutive symbols in the new uplink channel of the third-type subframe are used to transmit an uplink control channel, a seventh frequency band set in the new uplink channel of the third-type subframe other than the second preset quantity of symbols is used to transmit uplink data, and an eighth frequency band set in the new uplink channel of the third-type subframe other than the second preset quantity of symbols is used to transmit an uplink control channel. For ease of description, a symbol in the new uplink channel of the third-type subframe other than the second preset quantity of symbols is referred to as a second remaining uplink symbol, and the eighth frequency band set in the second remaining uplink symbol is a frequency band in a frequency band of the second remaining uplink symbol other than the seventh frequency band set in the second remaining uplink symbol, that is, the seventh frequency band set and the eighth frequency band set in the second remaining uplink symbol constitute the whole frequency band of the second remaining uplink symbol. FIG. 12(c) shows a third-type subframe. A second preset quantity of consecutive symbols in the new uplink channel of the third-type subframe are one symbol arranged first in a time order, that is, the first symbol in FIG. 12(c), and symbols other than the first symbol are second remaining uplink symbols, and the first symbol is used to transmit an uplink control channel, a seventh frequency band set in the second remaining uplink symbols is used to transmit uplink data, and an eighth frequency band set in the second remaining uplink symbols is used to transmit an uplink control channel.

Figure 11:
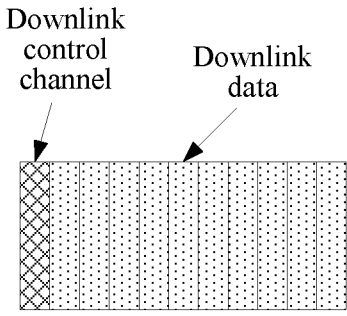
FIG. 11(a) is a schematic structural diagram of another first-type subframe according to an embodiment of the present invention.
FIG. 11(b) is a schematic structural diagram of still another first-type subframe according to an embodiment of the present invention.
FIG. 11(c) is a schematic structural diagram of yet another first-type subframe according to an embodiment of the present invention.
Figure 11:
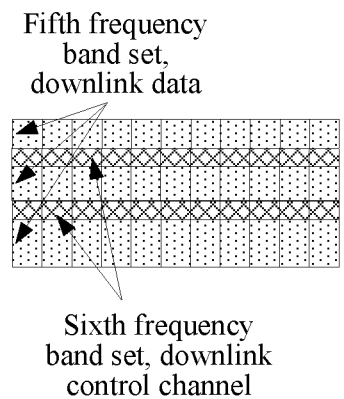
Figure 11:
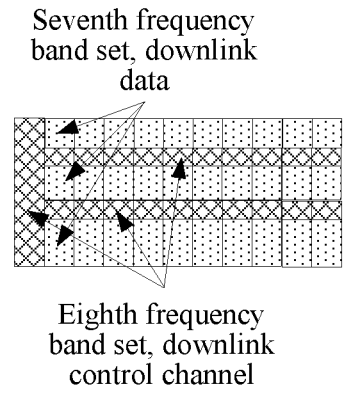

It should be noted that, there is no switching between uplink transmission and downlink transmission in the first-type subframes shown in FIG. 11. Therefore, there is no guard period in the first-type subframes. Similarly, there is also no switching between uplink transmission and downlink transmission in the third-type subframes shown in FIG. 12. Therefore, there is also no guard period in the third-type subframes. In addition, a design of the fifth frequency band set and the sixth frequency band set in the new downlink channel of the first-type subframe is similar to that of the first frequency band set and the second frequency band set in the downlink channel of the first-type subframe described above, and details are not described herein again in this embodiment of the present invention. A design of the fifth frequency band set and the sixth frequency band set in the new downlink channel of the second-type subframe, a design of the fifth frequency band set and the sixth frequency band set in the new uplink channel of the third-type subframe, and a design of the fifth frequency band set and the sixth frequency band set in the new uplink channel of the fourth-type subframe are similar to that of the first frequency band set and the second frequency band set in the new downlink channel of the first-type subframe described above, and details are also not described herein again in this embodiment of the present invention. Similarly, a design of the seventh frequency band set and the eighth frequency band set is similar, and details are not described again in this embodiment of the present invention.

In this embodiment of the present invention, a type of a first subframe for data transmission is determined, where the type of the first subframe is a first-type subframe, a second-type subframe, a third-type subframe, or a fourth-type subframe. An uplink control channel of the first-type subframe is located before a downlink channel of the first-type subframe, and a guard period is not included between the uplink control channel of the first-type subframe and the downlink channel of the first-type subframe, thereby reducing a quantity of times of switching, and further reducing a quantity of guard periods. An uplink control channel of the second-type subframe is located after a downlink channel of the second-type subframe, there is a guard period between the uplink control channel of the second-type subframe and the downlink channel of the second-type subframe, and only one time of switching between uplink transmission and downlink transmission is performed, thereby reducing the quantity of times of switching, and further reducing the quantity of guard periods. An uplink channel of the third-type subframe is located before a downlink control channel of the third-type subframe, and a guard period is not included between the uplink channel of the third-type subframe and the downlink control channel of the third-type subframe, thereby reducing the quantity of times of switching, and further reducing the quantity of guard periods. An uplink channel of the fourth-type subframe is located after a downlink control channel of the fourth-type subframe, there is a guard period between the uplink channel of the fourth-type subframe and the downlink control channel of the fourth-type subframe, and only one time of switching between uplink transmission and downlink transmission is performed, thereby reducing the quantity of times of switching, and further reducing the quantity of guard periods. In this way, utilization of wireless resources is improved.

Figure 13:
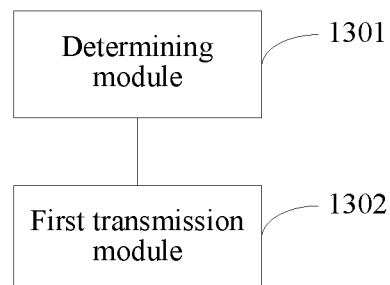
FIG. 13 is a schematic structural diagram of a data transmission device according to an embodiment of the present invention.

FIG. 13 is a schematic structural diagram of a data transmission device according to an embodiment of the present invention. Referring to FIG. 13, the device includes: a determining module 1301, configured to determine a type of a first subframe for data transmission, where the type of the first subframe is a first-type subframe, a second-type subframe, a third-type subframe, or a fourth-type subframe, where the first-type subframe includes an uplink control channel and a downlink channel, and the uplink control channel of the first-type subframe is located before the downlink channel of the first-type subframe; the second-type subframe includes an uplink control channel and a downlink channel, the uplink control channel of the second-type subframe is located after the downlink channel of the second-type subframe, and there is a guard period between the uplink control channel of the second-type subframe and the downlink channel of the second-type subframe; the third-type subframe includes an uplink channel and a downlink control channel, and the uplink channel of the third-type subframe is located before the downlink control channel of the third-type subframe; and the fourth-type subframe includes an uplink channel and a downlink control channel, the uplink channel of the fourth-type subframe is located after the downlink control channel of the fourth-type subframe, and there is a guard period between the uplink channel of the fourth-type subframe and the downlink control channel of the fourth-type subframe; and a first transmission module 1302, configured to transmit data in the first subframe according to the determined type of the first subframe.

Optionally, the device further includes: a second transmission module, configured to transmit data in a second subframe after the first subframe, where the second subframe is adjacent to the first subframe, where if a data transmission direction at a start moment of the second subframe is different from a data transmission direction at an end moment of the first subframe, a guard period is further included between the first subframe and the second subframe; and if the data transmission direction at the start moment of the second subframe is the same as the data transmission direction at the end moment of the first subframe, a time period is not included between the first subframe and the second subframe.

Optionally, the device further includes: a second transmission module, configured to transmit data in a second subframe after the first subframe, where the second subframe is adjacent to the first subframe, where if a data transmission direction at a start moment of the second subframe is an uplink and a data transmission direction at an end moment of the first subframe is a downlink, a guard period is further included between the first subframe and the second subframe.

Optionally, the determining module 1301 includes: a first determining module, configured to determine, according to a first preset period, that the type of the first subframe is the first-type subframe or the second-type subframe; or a second determining module, configured to determine, according to a second preset period, that the type of the first subframe is the third-type subframe or the fourth-type subframe.

Optionally, when it is determined, according to the first preset period, that the type of the first subframe is the first-type subframe or the second-type subframe, the first subframe is used to transmit one or a combination of a synchronization signal, a broadcast signal, or a discovery reference signal, where the broadcast signal is used to carry information about the first preset period and/or the second preset period.

Optionally, when the first preset period and the second preset period are the same, the broadcast signal indicates the first preset period or the second preset period, the broadcast signal further indicates an offset between the first preset period and the second preset period, and the offset is used to indicate a subframe number difference between subframes corresponding to the first preset period and the second preset period.

Optionally, an uplink control channel or a downlink control channel of the first subframe carries indication information, the indication information is used to indicate a subframe type of a $k^{th}$ subframe after the first subframe, and k is a positive integer.

Optionally, a first preset quantity of consecutive symbols in the downlink channel of the first-type subframe or a first preset quantity of consecutive symbols in the downlink channel of the second-type subframe are used to transmit a downlink control channel, and a symbol in the downlink channel of the first-type subframe other than the first preset quantity of symbols or a symbol in the downlink channel of the second-type subframe other than the first preset quantity of symbols is used to transmit downlink data, where the first preset quantity of consecutive symbols are a first preset quantity of symbols arranged first in a time order, or the first preset quantity of consecutive symbols are a first preset quantity of symbols arranged last in a time order.

Optionally, a first frequency band set in the downlink channel of the first-type subframe or a first frequency band set in the downlink channel of the second-type subframe is used to transmit downlink data, and a second frequency band set in the downlink channel of the first-type subframe or a second frequency band set in the downlink channel of the second-type subframe is used to transmit a downlink control channel.

Optionally, a first preset quantity of consecutive symbols in the downlink channel of the first-type subframe or a first preset quantity of consecutive symbols in the downlink channel of the second-type subframe are used to transmit a downlink control channel, a third frequency band set in a symbol in the downlink channel of the first-type subframe other than the first preset quantity of symbols or a third frequency band set in a symbol in the downlink channel of the second-type subframe other than the first preset quantity of symbols is used to transmit downlink data, and a fourth frequency band set in the symbol in the downlink channel of the first-type subframe or the downlink channel of the second-type subframe other than the first preset quantity of symbols or a fourth frequency band set in the symbol in the downlink channel of the second-type subframe other than the first preset quantity of symbols is used to transmit a downlink control channel.

Optionally, a second preset quantity of consecutive symbols in the uplink channel of the third-type subframe or a second preset quantity of consecutive symbols in the uplink channel of the fourth-type subframe are used to transmit an uplink control channel, and a symbol in the uplink channel of the third-type subframe other than the second preset quantity of symbols or a symbol in the uplink channel of the fourth-type subframe other than the second preset quantity of symbols is used to transmit uplink data, where the second preset quantity of consecutive symbols are a second preset quantity of symbols arranged first in a time order, or the second preset quantity of consecutive symbols are a second preset quantity of symbols arranged last in a time order.

Optionally, a first frequency band set in the uplink channel of the third-type subframe or a first frequency band set in the uplink channel of the fourth-type subframe is used to transmit uplink data, and a second frequency band set in the uplink channel of the third-type subframe or a second frequency band set in the uplink channel of the fourth-type subframe is used to transmit an uplink control channel.

Optionally, a second preset quantity of consecutive symbols in the uplink channel of the third-type subframe or a second preset quantity of consecutive symbols in the uplink channel of the fourth-type subframe are used to transmit an uplink control channel, a third frequency band set in a symbol in the uplink channel of the third-type subframe other than the second preset quantity of symbols or a third frequency band set in a symbol in the uplink channel of the fourth-type subframe other than the second preset quantity of symbols is used to transmit uplink data, and a fourth frequency band set in the symbol in the uplink channel of the third-type subframe other than the second preset quantity of symbols or a fourth frequency band set in the symbol in the uplink channel of the fourth-type subframe other than the second preset quantity of symbols is used to transmit an uplink control channel.

In this embodiment of the present invention, a type of a first subframe for data transmission is determined, where the type of the first subframe is a first-type subframe, a second-type subframe, a third-type subframe, or a fourth-type subframe. An uplink control channel of the first-type subframe is located before a downlink channel of the first-type subframe, and a guard period is not included between the uplink control channel of the first-type subframe and the downlink channel of the first-type subframe, thereby reducing a quantity of times of switching, and further reducing a quantity of guard periods. An uplink control channel of the second-type subframe is located after a downlink channel of the second-type subframe, there is a guard period between the uplink control channel of the second-type subframe and the downlink channel of the second-type subframe, and only one time of switching between uplink transmission and downlink transmission is performed, thereby reducing the quantity of times of switching, and further reducing the quantity of guard periods. An uplink channel of the third-type subframe is located before a downlink control channel of the third-type subframe, and a guard period is not included between the uplink channel of the third-type subframe and the downlink control channel of the third-type subframe, thereby reducing the quantity of times of switching, and further reducing the quantity of guard periods. An uplink channel of the fourth-type subframe is located after a downlink control channel of the fourth-type subframe, there is a guard period between the uplink channel of the fourth-type subframe and the downlink control channel of the fourth-type subframe, and only one time of switching between uplink transmission and downlink transmission is performed, thereby reducing the quantity of times of switching, and further reducing the quantity of guard periods. In this way, utilization of wireless resources is improved.

Figure 14:
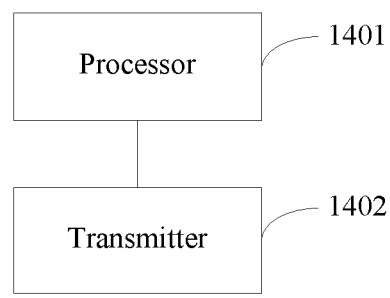
FIG. 14 is a schematic structural diagram of another data transmission device according to an embodiment of the present invention.

FIG. 14 is a schematic structural diagram of another data transmission device according to an embodiment of the present invention. Referring to FIG. 14, the device includes: a processor 1401, configured to determine a type of a first subframe for data transmission, where the type of the first subframe is a first-type subframe, a second-type subframe, a third-type subframe, or a fourth-type subframe, where the first-type subframe includes an uplink control channel and a downlink channel, and the uplink control channel of the first-type subframe is located before the downlink channel of the first-type subframe; the second-type subframe includes an uplink control channel and a downlink channel, the uplink control channel of the second-type subframe is located after the downlink channel of the second-type subframe, and there is a guard period between the uplink control channel of the second-type subframe and the downlink channel of the second-type subframe; the third-type subframe includes an uplink channel and a downlink control channel, and the uplink channel of the third-type subframe is located before the downlink control channel of the third-type subframe; and the fourth-type subframe includes an uplink channel and a downlink control channel, the uplink channel of the fourth-type subframe is located after the downlink control channel of the fourth-type subframe, and there is a guard period between the uplink channel of the fourth-type subframe and the downlink control channel of the fourth-type subframe; and a transmitter 1402, configured to transmit data in the first subframe according to the determined type of the first subframe.

Optionally, the device further includes: the transmitter 1402, further configured to transmit data in a second subframe after the first subframe, where the second subframe is adjacent to the first subframe, where if a data transmission direction at a start moment of the second subframe is different from a data transmission direction at an end moment of the first subframe, a guard period is further included between the first subframe and the second subframe; and if the data transmission direction at the start moment of the second subframe is the same as the data transmission direction at the end moment of the first subframe, a time period is not included between the first subframe and the second subframe.

Optionally, the device further includes: the transmitter 1402, further configured to transmit data in a second subframe after the first subframe, where the second subframe is adjacent to the first subframe, where if a data transmission direction at a start moment of the second subframe is an uplink and a data transmission direction at an end moment of the first subframe is a downlink, a guard period is further included between the first subframe and the second subframe.

Optionally, the processor 1401 is further configured to determine, according to a first preset period, that the type of the first subframe is the first-type subframe or the second-type subframe; or the processor 1401 is further configured to determine, according to a second preset period, that the type of the first subframe is the third-type subframe or the fourth-type subframe.

Optionally, when it is determined, according to the first preset period, that the type of the first subframe is the first-type subframe or the second-type subframe, the first subframe is used to transmit one or a combination of a synchronization signal, a broadcast signal, or a discovery reference signal, where the broadcast signal is used to carry information about the first preset period and/or the second preset period.

Optionally, when the first preset period and the second preset period are the same, the broadcast signal indicates the first preset period or the second preset period, the broadcast signal further indicates an offset between the first preset period and the second preset period, and the offset is used to indicate a subframe number difference between subframes corresponding to the first preset period and the second preset period.

Optionally, an uplink control channel or a downlink control channel of the first subframe carries indication information, the indication information is used to indicate a subframe type of a $k^{th}$ subframe after the first subframe, and k is a positive integer.

Optionally, a first preset quantity of consecutive symbols in the downlink channel of the first-type subframe or a first preset quantity of consecutive symbols in the downlink channel of the second-type subframe are used to transmit a downlink control channel, and a symbol in the downlink channel of the first-type subframe other than the first preset quantity of symbols or a symbol in the downlink channel of the second-type subframe other than the first preset quantity of symbols is used to transmit downlink data, where the first preset quantity of consecutive symbols are a first preset quantity of symbols arranged first in a time order, or the first preset quantity of consecutive symbols are a first preset quantity of symbols arranged last in a time order.

Optionally, a first frequency band set in the downlink channel of the first-type subframe or a first frequency band set in the downlink channel of the second-type subframe is used to transmit downlink data, and a second frequency band set in the downlink channel of the first-type subframe or a second frequency band set in the downlink channel of the second-type subframe is used to transmit a downlink control channel.

Optionally, a first preset quantity of consecutive symbols in the downlink channel of the first-type subframe or a first preset quantity of consecutive symbols in the downlink channel of the second-type subframe are used to transmit a downlink control channel, a third frequency band set in a symbol in the downlink channel of the first-type subframe other than the first preset quantity of symbols or a third frequency band set in a symbol in the downlink channel of the second-type subframe other than the first preset quantity of symbols is used to transmit downlink data, and a fourth frequency band set in the symbol in the downlink channel of the first-type subframe or the downlink channel of the second-type subframe other than the first preset quantity of symbols or a fourth frequency band set in the symbol in the downlink channel of the second-type subframe other than the first preset quantity of symbols is used to transmit a downlink control channel.

Optionally, a second preset quantity of consecutive symbols in the uplink channel of the third-type subframe or a second preset quantity of consecutive symbols in the uplink channel of the fourth-type subframe are used to transmit an uplink control channel, and a symbol in the uplink channel of the third-type subframe other than the second preset quantity of symbols or a symbol in the uplink channel of the fourth-type subframe other than the second preset quantity of symbols is used to transmit uplink data, where the second preset quantity of consecutive symbols are a second preset quantity of symbols arranged first in a time order, or the second preset quantity of consecutive symbols are a second preset quantity of symbols arranged last in a time order.

Optionally, a first frequency band set in the uplink channel of the third-type subframe or a first frequency band set in the uplink channel of the fourth-type subframe is used to transmit uplink data, and a second frequency band set in the uplink channel of the third-type subframe or a second frequency band set in the uplink channel of the fourth-type subframe is used to transmit an uplink control channel.

Optionally, a second preset quantity of consecutive symbols in the uplink channel of the third-type subframe or a second preset quantity of consecutive symbols in the uplink channel of the fourth-type subframe are used to transmit an uplink control channel, a third frequency band set in a symbol in the uplink channel of the third-type subframe other than the second preset quantity of symbols or a third frequency band set in a symbol in the uplink channel of the fourth-type subframe other than the second preset quantity of symbols is used to transmit uplink data, and a fourth frequency band set in the symbol in the uplink channel of the third-type subframe other than the second preset quantity of symbols or a fourth frequency band set in the symbol in the uplink channel of the fourth-type subframe other than the second preset quantity of symbols is used to transmit an uplink control channel.

In this embodiment of the present invention, a type of a first subframe for data transmission is determined, where the type of the first subframe is a first-type subframe, a second-type subframe, a third-type subframe, or a fourth-type subframe. An uplink control channel of the first-type subframe is located before a downlink channel of the first-type subframe, and a guard period is not included between the uplink control channel of the first-type subframe and the downlink channel of the first-type subframe, thereby reducing a quantity of times of switching, and further reducing a quantity of guard periods. An uplink control channel of the second-type subframe is located after a downlink channel of the second-type subframe, there is a guard period between the uplink control channel of the second-type subframe and the downlink channel of the second-type subframe, and only one time of switching between uplink transmission and downlink transmission is performed, thereby reducing the quantity of times of switching, and further reducing the quantity of guard periods. An uplink channel of the third-type subframe is located before a downlink control channel of the third-type subframe, and a guard period is not included between the uplink channel of the third-type subframe and the downlink control channel of the third-type subframe, thereby reducing the quantity of times of switching, and further reducing the quantity of guard periods. An uplink channel of the fourth-type subframe is located after a downlink control channel of the fourth-type subframe, there is a guard period between the uplink channel of the fourth-type subframe and the downlink control channel of the fourth-type subframe, and only one time of switching between uplink transmission and downlink transmission is performed, thereby reducing the quantity of times of switching, and further reducing the quantity of guard periods. In this way, utilization of wireless resources is improved.

A person of ordinary skill in the art may understand that all or some of the steps of the embodiments may be implemented by hardware or a program instructing related hardware. The program may be stored in a computer-readable storage medium. The storage medium may include: a read-only memory, a magnetic disk, or an optical disc.

The foregoing descriptions are merely examples of embodiments of the present invention, but are not intended to limit the present invention. Any modification, equivalent replacement, and improvement made without departing from the spirit and principle of the present invention shall fall within the protection scope of the present invention.

The invention claimed is:

1. A communication method, comprising:
   transmitting, by a base station, a downlink channel in one or more symbols of a subframe; and
   receiving, by the base station, an acknowledgment/negative acknowledgment (ACK/NACK) feedback in response to the downlink channel in one or more symbols of the subframe; and
   wherein the one or more symbols of the subframe in which the ACK/NACK feedback is received are located in the subframe after the one or more symbols in which the downlink channel is transmitted.

2. The method according to claim 1, wherein symbols of the subframe are orthogonal frequency division multiplex (OFDM) symbols.

3. The method according to claim 1, further comprising:
   transmitting, by the base station, indication information to a user equipment, wherein the indication information indicates a subframe type, and the subframe type corresponds to a subframe in which one or more symbols of the subframe allocated for ACK/NACK feedback are located in the subframe after one or more symbols allocated for a downlink channel.

4. The method according to claim 1, further comprising:
   transmitting, by the base station, a downlink control channel in one or more symbols of another subframe which is adjacent to the subframe in time domain; and
   receiving, by the base station, a uplink channel in one or more symbols of the another subframe; and
   wherein the one or more symbols of the another subframe in which the uplink channel is received are located in the another subframe after the one or more symbols of the another subframe in which the downlink control channel is transmitted.

5. The method according to claim 1, wherein the ACK/NACK feedback is received in response to transmitting downlink data of the downlink channel.

6. A network device, comprising:
   a transmitter, configured to transmit a downlink channel in one or more symbols of a subframe; and
   a receiver, configured to receive an acknowledgment/negative acknowledgment (ACK/NACK) feedback in response to transmitting the downlink channel in one or more symbols of the subframe; and
   wherein the one or more symbols of the subframe in which the ACK/NACK feedback is received are located in the subframe after the one or more symbols in which the downlink channel is transmitted.

7. The network device according to claim 6, wherein symbols of the subframe are orthogonal frequency division multiplex (OFDM) symbols.

8. The network device according to claim 6, wherein the transmitter is further configured to transmit indication information to a user equipment, wherein the indication information indicates a subframe type, and the subframe type corresponds to a subframe in which one or more symbols of the subframe allocated for transmitting the ACK/NACK feedback are located in the subframe after one or more symbols for allocated for transmitting a downlink channel.

9. The network device according to claim 6, wherein:
the transmitter is further configured to transmit a downlink control channel in one or more symbols of another subframe which is adjacent to the subframe in time domain;
the receiver is further configured to receive a uplink channel in one or more symbols of the another subframe; and
the one or more symbols of the another subframe in which the uplink channel is received are located in the another subframe after the one or more symbols of the another subframe in which the downlink control channel is transmitted.

10. The network device according to claim 6, wherein the ACK/NACK feedback is received in response to transmitting downlink data of the downlink channel.

11. A non-transitory computer-readable storage medium having computer-readable instructions recorded thereon which, when executed by a computer, cause the computer to implement operations comprising:
transmitting a downlink channel in one or more symbols of a subframe; and
receiving an acknowledgment/negative acknowledgment (ACK/NACK) feedback in response to transmitting the downlink channel in one or more symbols of the subframe; and
wherein the one or more symbols of the subframe in which the ACK/NACK feedback is received are located in the subframe after the one or more symbols in which the downlink channel is transmitted.

12. The non-transitory computer-readable storage medium according to claim 11, wherein symbols of the subframe are orthogonal frequency division multiplex (OFDM) symbols.

13. The non-transitory computer-readable storage medium according to claim 11, wherein the operations further comprise:
transmitting indication information to a user equipment, wherein the indication information indicates a subframe type, and the subframe type corresponds to a subframe in which one or more symbols of the subframe allocated for transmitting ACK/NACK feedback are located in the subframe after one or more symbols allocated for transmitting a downlink channel.

14. The non-transitory computer-readable storage according to claim 11, wherein the operations further comprise:
transmitting a downlink control channel in one or more symbols of another subframe which is adjacent to the subframe in time domain; and
receiving an uplink channel in one or more symbols of the another subframe; and
wherein the one or more symbols of the another subframe in which the uplink channel is received are located in the another subframe after the one or more symbols of the another subframe in which the downlink control channel is received.

15. The non-transitory computer-readable storage medium according to claim 11, wherein the ACK/NACK feedback is received in response to transmitting downlink data of the downlink channel.

16. A communication system, comprising a base station, wherein the base station is configured to perform the following:
transmitting a downlink channel in one or more first symbols of a subframe; and
receiving an acknowledgment/negative acknowledgment (ACK/NACK) feedback in response to transmitting the downlink channel in one or more second symbols of the subframe; and
wherein the one or more second symbols of the subframe in which the ACK/NACK feedback is received are located in the subframe after the one or more first symbols in which the downlink channel is transmitted.

17. The communication system according to claim 16, wherein symbols of the subframe are orthogonal frequency division multiplex (OFDM) symbols.

18. The communication system according to claim 16, wherein the base station is further configured to perform the following:
transmitting indication information to a user equipment, wherein the indication information indicates a subframe type, and the subframe type corresponds to a subframe in which one or more symbols of the subframe allocated for transmitting ACK/NACK feedback are located in the subframe after one or more symbols allocated for transmitting a downlink channel.

19. The communication system according to claim 16, wherein the base station is further configured to perform the following:
transmitting a downlink control channel in one or more symbols of another subframe which is adjacent to the subframe in time domain; and
receiving an uplink channel in one or more symbols of the another subframe; and
wherein the one or more symbols of the another subframe in which the uplink channel is received are located in the another subframe after the one or more symbols of the another subframe in which the downlink control channel is transmitted.

20. The communication system according to claim 16, wherein the ACK/NACK feedback is received in response to transmitting downlink data of the downlink channel.

21. The communication system according to claim 16, further comprising a user equipment, wherein the user equipment is configured to perform the following:
receiving the downlink channel in the one or more first symbols of the subframe; and
transmitting the ACK/NACK feedback in response to receiving the downlink channel in the one or more second symbols of the subframe.

22. A network device, comprising:
a transmitter;
a receiver;
a processor; and
a non-transitory computer-readable storage medium storing a program to be executed by the processor, the program including instructions for:
sending, using the transmitter, a downlink channel in one or more symbols of a subframe; and
receiving, using the receiver, an acknowledgment/negative acknowledgment (ACK/NACK) feedback in response to sending the downlink channel in one or more symbols of the subframe; and wherein the one or more symbols of the subframe in which the ACK/NACK feedback is received are located in the subframe after the one or more symbols in which the downlink channel is transmitted.

23. The network device according to claim 22, wherein symbols of the subframe are orthogonal frequency division multiplex (OFDM) symbols.

24. The network device according to claim 22, wherein the program further includes instructions for:
sending, using the transmitter, indication information to a user equipment, wherein the indication information indicates a subframe type, and the subframe type corresponds to a subframe in which one or more symbols of the subframe allocated for transmitting the ACK/NACK feedback are located in the subframe after one or more symbols for allocated for transmitting a downlink channel.

25. The network device according to claim 22, wherein the program further includes instructions for:
sending, using the transmitter, a downlink control channel in one or more symbols of another subframe which is adjacent to the subframe in time domain;
receiving, using the receiver, an uplink channel in one or more symbols of the another subframe; and
wherein the one or more symbols of the another subframe in which the uplink channel is received are located in the another subframe after the one or more symbols of the another subframe in which the downlink control channel is transmitted.

26. The network device according to claim 22, wherein the ACK/NACK feedback is received in response to transmitting downlink data of the downlink channel.

\* \* \* \* \*